(12) United States Patent  
Acquard et al.

(10) Patent No.: US 11,629,096 B2  
(45) Date of Patent: Apr. 18, 2023

(54) TEMPORARY BONDING OF GLASS PAIRS USING CATIONIC SURFACTANTS AND/OR ORGANIC SALTS

(71) Applicant: CORNING INCORPORATED, Corning, NY (US)

(72) Inventors: Daniel Florian Acquard, Horseheads, NY (US); Indrani Bhattacharyya, Ithaca, NY (US); Sushmit Sunil Kumar Goyal, Painted Post, NY (US); Prantik Mazumder, Ithaca, NY (US); Pei-Lien Tseng, Zhubei (TW)

(73) Assignee: Corning Incorporated, Corning, NY (US)

( * ) Notice: Subject to any disclaimer, the term of this patent is extended or adjusted under 35 U.S.C. 154(b) by 329 days.

(21) Appl. No.: 16/764,120

(22) PCT Filed: Nov. 20, 2018

(86) PCT No.: PCT/US2018/061959  
§ 371 (c)(1),  
(2) Date: May 14, 2020

(87) PCT Pub. No.: WO2019/100050  
PCT Pub. Date: May 23, 2019

(65) Prior Publication Data  
US 2020/0392040 A1    Dec. 17, 2020

Related U.S. Application Data

(60) Provisional application No. 62/588,568, filed on Nov. 20, 2017.

(51) Int. Cl.  
*B32B 7/06* (2019.01)  
*C03C 27/10* (2006.01)  
(Continued)

(52) U.S. Cl.  
CPC .............. *C03C 27/10* (2013.01); *B32B 7/06* (2013.01); *B32B 17/06* (2013.01); *C03C 23/006* (2013.01);  
(Continued)

(58) Field of Classification Search  
CPC .. B32B 7/04; B32B 4/12; B32B 17/06; B32B 17/00036  
See application file for complete search history.

(56) References Cited

U.S. PATENT DOCUMENTS

| 9,889,635 B2 | 2/2018 | Bellman et al. |
| 10,046,542 B2 | 8/2018 | Adib et al. |

(Continued)

FOREIGN PATENT DOCUMENTS

| CN | 105438634 A | 3/2016 |
| CN | 106132688 A | 11/2016 |

(Continued)

OTHER PUBLICATIONS

Chinese Patent Application No. 201880075135.0, Office Action dated Mar. 2, 2022, 22 pages (12 pages of English Translation and 10 pages of Original document), Chinese Patent Office.

(Continued)

*Primary Examiner* — Elizabeth E Mulvaney  
(74) *Attorney, Agent, or Firm* — Yunling Shang

(57) ABSTRACT

Described herein are articles and methods of making articles, for example glass articles, comprising a thin sheet and a carrier, wherein the thin sheet and carrier are bonded together using a modification (coating) layer, for example a coating layer comprising a cationic surfactant or a coating layer comprising an organic salt, and associated deposition methods. The modification layer bonds the thin sheet and carrier together with sufficient bond strength to prevent delamination of the thin sheet and the carrier during high (Continued)

temperature (? 500° C.) processing while also preventing formation of a permanent bond between the sheets during such processing.

24 Claims, 12 Drawing Sheets

(51) Int. Cl.
  *C03C 23/00* (2006.01)
  *B32B 17/06* (2006.01)
(52) U.S. Cl.
  CPC ...... *C03C 23/0075* (2013.01); *B32B 2255/24* (2013.01)

(56) References Cited

U.S. PATENT DOCUMENTS

| | | |
|---|---|---|
| 10,086,584 B2 | 10/2018 | Bellman et al. |
| 2015/0099110 A1 | 4/2015 | Bellman et al. |
| 2015/0329415 A1 | 11/2015 | Bellman et al. |
| 2016/0221860 A1 | 8/2016 | Bellman et al. |
| 2018/0264784 A1 | 9/2018 | Murofushi et al. |
| 2018/0297889 A1 | 10/2018 | Hamilton et al. |
| 2019/0184686 A1 | 6/2019 | Bellman et al. |
| 2020/0039872 A1 | 2/2020 | Bellman et al. |

FOREIGN PATENT DOCUMENTS

| | | |
|---|---|---|
| EP | 2848595 A1 | 3/2015 |
| JP | 2006002140 A | 1/2006 |
| JP | 2006072539 A | 3/2006 |
| JP | 2014016597 A | 1/2014 |
| JP | 2016-064862 A | 4/2016 |
| WO | 2015113020 A1 | 7/2015 |
| WO | 2017/058969 A1 | 4/2017 |
| WO | 2017087745 A1 | 5/2017 |
| WO | 2017/090686 A1 | 6/2017 |

OTHER PUBLICATIONS

Mark W Rutland, et al., "Surface Forces Silica Surfaces in Cationic Surfactant Solutions: Adsorption and Bilayer Formation at Normal and High pH", American Chemical Society, vol. 10 (4), Apr. 1994, pp. 1110-1121.
Bedjaoui et al.; "Direct Bonding and Debonding Approach of Ultrathin Glass Substrates for High Temperature Devices"; 2017 IEEE 67th Electronic Components and Technology Conference; pp. 725-732.
International Search Report and Written Opinion of the International Searching Authority; PCT/US2018/061959; dated Apr. 16, 2019; 21 Pages; European Patent Office.
Rutland et al.; "Surface Forces Between Silica Surfaces in Cationic Surfactant Solutions Adsorption and Bilayer Formation At Normaland High pH"; Langmuir, 1994, 10, pp. 1110-1121.
Wu; "Calculation of Interfacial Tension in Polymer Systems"; J. Polymer Sci.: Part C; No. 34; pp. 19-30 (1971.

TEMPORARY BONDING OF GLASS PAIRS USING CATIONIC SURFACTANTS AND/OR ORGANIC SALTS

This application claims the benefit of priority under 35 U.S.C. § 371 of International Application No. PCT/US2018/061959, filed on Nov. 20, 2018, which claims the benefit of priority to U.S. Provisional Application No. 62/588,568 filed on Nov. 20, 2017, the content of each of which is relied upon and incorporated herein by reference in its entirety.

FIELD

The present disclosure relates generally to articles including and methods for making thin sheets on carriers and, more particularly, to articles including and methods for making thin glass sheets controllably bonded on glass carriers.

BACKGROUND

Flexible substrates offer the promise of cheaper devices using roll-to-roll processing, and the potential to make thinner, lighter, more flexible and durable displays. However, the technology, equipment, and processes for roll-to-roll processing of high quality displays are not yet fully developed. Since panel makers have already heavily invested in toolsets to process large sheets of glass, laminating a flexible substrate to a carrier and making display devices on the flexible substrate by sheet-to-sheet processing offers a shorter term solution to develop the value proposition of thinner, lighter, and more flexible displays. Displays have been demonstrated on polymer sheets, for example polyethylene naphthalate (PEN), where the device fabrication was sheet-to-sheet with the PEN laminated to a glass carrier. The upper temperature limit of the PEN limits the device quality and process that can be used. In addition, the high permeability of the polymer substrate leads to environmental degradation of organic light emitting diode (OLED) devices where a near hermetic package is beneficial. Thin film encapsulation offers a potential solution to overcome this limitation, but it has not yet been demonstrated to offer acceptable yields at large volumes.

In a similar manner, display devices can be manufactured using a glass carrier laminated to one or more thin glass substrates. It is anticipated that the low permeability and improved temperature and chemical resistance of the thin glass will enable higher performance longer lifetime flexible displays.

Some devices utilize color filter (CF) or amorphous silicon thin film transistors (a-Si TFTs), which are typically fabricated at temperatures around 250° C. and 350° C., respectively. However, higher temperature applications, including, for example, oxide thin film transistors (oxide TFT or ox-TFT), are also important. Oxide TFT processing is typically performed at temperatures of 350 to 450° C. and additional processing techniques such as vacuum, and wet etch environments may also be used. These conditions limit the materials that may be used, and place high demands on the carrier and/or thin sheet. Accordingly, what is desired is a carrier approach that utilizes the existing capital infrastructure of the manufacturers, enables processing of glass sheets, e.g., thin sheets having a thickness ≤0.3 millimeters (mm) thick, without loss of bond strength between the thin sheet and carrier at higher processing temperatures, and wherein the thin sheet debonds easily from the carrier at the end of the process. The approach should allow for: a) spontaneous bonding between a carrier and a thin sheet at room temperature, preferably without the need for lamination, to provide sufficient bond, or adhesion energy on the order of 100-500 mJ/m$^2$; b) subsequent wet and dry processing steps without detachment of the thin sheet from the carrier; c) ability for the bonded pair to withstand the thermal, chemical, vacuum and wet processing steps of fabrication; d) minimal outgassing during thermal processing; and e) ease of separation of the thin sheet from the carrier at the end of processing.

One commercial advantage is that manufacturers will be able to utilize their existing capital investment in processing equipment while gaining the advantages of the thin sheets, e.g., thin glass sheets, for photovoltaic (PV), OLED, liquid crystal displays (LCDs) and patterned thin film transistor (TFT) electronics, for example. Additionally, such an approach enables process flexibility, including: processes for cleaning and surface preparation of the thin sheet and carrier to facilitate bonding.

SUMMARY

In light of the above, there is a need for a thin sheet-carrier article that can withstand the rigors of a-Si and/or ox-TFT processing, including high temperature processing (without outgassing which would be incompatible with the semiconductor or display making processes in which it will be used), yet preferably allow the entire area of the thin sheet to be removed (either all at once, or in sections) from the carrier so as to allow the reuse of the carrier for processing another thin sheet. The present specification describes methods to control the adhesion between the carrier and thin sheet to create a temporary bond sufficiently strong to survive a-Si and ox-TFT processing (including processing at temperatures of about 200° C., about 300° C., about 400° C., and up to about 500° C.), but weak enough to permit debonding of the sheet from the carrier, even after high-temperature processing. Such controlled bonding can be utilized to create an article having a re-usable carrier. More specifically, the present disclosure provides surface modification layers (including various materials and associated surface heat treatments), that may be provided on the thin sheet, the carrier, or both, to control both room-temperature van der Waals, and/or hydrogen bonding and/or electrostatic and high temperature covalent bonding between the thin sheet and carrier. Even more specifically, the present disclosure describes methods of depositing a coating, or modification layer that serves to bond a thin sheet to a carrier, methods for preparing the coating layer for bonding, and bonding the coating layer to both the thin sheet and the carrier. These methods produce bonding between the components such that the bonding energy is not too high, which might render the components inseparable after electronic device processing, and such that the bonding energy is not too low, which might lead to compromised bonding quality, thus leading to possible debonding or fluid ingress between the thin sheet and carrier during electronic device processing. These methods also produce an article that exhibits low outgassing and survives high temperature processing, for example color filter (CF) processing, amorphous silicon (a-Si) TFT processing, and ox-TFT processing, as well as additional processing steps, for example wet cleaning and dry etching.

In a first aspect, there is an article comprising: a first sheet having a first bonding surface, a second sheet having a second bonding surface and a modification layer having a third bonding surface, the modification layer coupling the first sheet and the second sheet. The modification layer comprises one or more cationic surfactants.

In an example of the first aspect, the cationic surfactant comprises a head group comprising a charged nitrogen selected from the group consisting of primary, secondary, tertiary, or quaternary ammonium, pyridinium, and combinations thereof.

In another example of the first aspect, the cationic surfactant comprises at least one $C_4$-$C_{24}$ hydrophobic group.

In yet another example of the first aspect, the cationic surfactant is selected from the group consisting of cetyltrimethylammonium bromide, cetylpyridinium chloride, octyltrimethylammonium bromide, and 1-butylpyridinium chloride.

In a second aspect, there is an article comprising a first sheet having a first bonding surface and a second sheet comprising a second bonding surface. A modification layer comprising a third bonding surface couples the first sheet to the second sheet. The modification bonding layer comprises one or more organic salts.

In an example of the second aspect, the organic salt comprises a positively charged nitrogen, phosphorus, sulfur, boron, or carbon.

In another example of the second aspect, the organic salt comprises an ammonium group.

In another example of the second aspect, the organic salt comprises a phosphonium ion.

In another example of the second aspect, the organic salt is selected from the group consisting of tetramethylammonium bromide, tetraethylammonium bromide, and tetraphenylphosphonium chloride.

In an example of either the first or the second aspect, the surfactant or the organic salt, respectively, is substantially free of oxygen.

In an example of either or both of the first and/or second aspects, the modification layer comprises an average thickness of from about 0.1 nm to about 10 nm.

In another example of the first aspect, the thickness of the modification layer is sub-monolayer.

In another example of the first aspect, the modification layer demonstrates an increasing water contact angle with increasing surfactant concentration.

In another example of the first aspect, the cetyltrimethylammonium bromide modification demonstrates an increasing water contact angle with increasing surfactant concentration.

In another example of the first aspect, the third bonding surface is bonded with the second bonding surface with a bonding energy of from about 150 to about 750 mJ/m$^2$ after holding the article at 350° C. for 2 hours.

In another example of the first aspect, the third bonding surface is bonded with the second bonding surface with a bonding energy of from about 100 to about 500 mJ/m$^2$ after holding the article at 370° C. for 30 minutes.

In another example of the first aspect, the cationic surfactant comprises cetyltrimethylammonium bromide and the third bonding surface is bonded with the second bonding surface with a bonding energy of from about 100 to about 750 mJ/m$^2$ after holding the article at 350° C. for 2 hours.

In another example of the first aspect, the cationic surfactant comprises cetyltrimethylammonium bromide and the third bonding surface is bonded with the second bonding surface with a bonding energy of from about 150 to about 300 mJ/m$^2$ after holding the article at 370° C. for 30 minutes.

In another example of the first aspect, the cationic surfactant comprises cetylpyridinium chloride and the third bonding surface is bonded with the second bonding surface with a bonding energy of from about 150 to about 350 mJ/m$^2$ after holding the article at 350° C. for 2 hours.

In another example of the first aspect, the cationic surfactant comprises cetylpyridinium chloride and the third bonding surface is bonded with the second bonding surface with a bonding energy of from about 200 to about 400 mJ/m$^2$ after holding the article at 370° C. for 30 minutes.

In another example of the first aspect, the cationic surfactant comprises octyltrimethylammonium bromide and the third bonding surface is bonded with the second bonding surface with a bonding energy of from about 300 to about 500 mJ/m$^2$ after holding the article at 350° C. for 2 hours.

In another example of the first aspect, the cationic surfactant comprises octyltrimethylammonium bromide and the third bonding surface is bonded with the second bonding surface with a bonding energy of from about 300 to about 500 mJ/m$^2$ after holding the article at 370° C. for 30 minutes.

In an example of the first aspect, the cationic surfactant comprises 1-butylpyridinium chloride and the third bonding surface is bonded with the second bonding surface with a bonding energy of from about 200 to about 350 mJ/m$^2$ after holding the article at 350° C. for 2 hours.

In another example of the first aspect, the cationic surfactant comprises 1-butylpyridinium chloride and the third bonding surface is bonded with the second bonding surface with a bonding energy of from about 200 to about 400 mJ/m$^2$ after holding the article at 370° C. for 30 minutes.

In an example of the second aspect, the third bonding surface is bonded with the second bonding surface with a bonding energy of from about 200 to about 500 mJ/m$^2$ after holding the article at 350° C. for 2 hours.

In another example of the second aspect, the third bonding surface is bonded with the second bonding surface with a bonding energy of from about 200 to about 350 mJ/m$^2$ after holding the article at 370° C. for 30 minutes.

In another example of the second aspect, the organic salt comprises tetramethylammonium bromide, and the third bonding surface is bonded with the second bonding surface with a bonding energy of from about 200 to about 400 mJ/m$^2$ after holding the article at 350° C. for 2 hours.

In another example of the second aspect, the organic salt comprises tetramethylammonium bromide, and the third bonding surface is bonded with the second bonding surface with a bonding energy of from about 150 to about 300 mJ/m$^2$ after holding the article at 370° C. for 30 minutes.

In another example of the second aspect, the organic salt comprises tetraethylammonium bromide and the third bonding surface is bonded with the second bonding surface with a bonding energy of from about 260 to about 420 mJ/m$^2$ after holding the article at 350° C. for 2 hours.

In yet another example of the second aspect, the organic salt comprises tetraethylammonium bromide and the third bonding surface is bonded with the second bonding surface with a bonding energy of from about 250 to about 310 mJ/m$^2$ after holding the article at 370° C. for 30 minutes.

In another example of the second aspect, the organic salt comprises tetraphenylphosphonium chloride and the third bonding surface is bonded with the second bonding surface with a bonding energy of from about 250 to about 500 mJ/m$^2$ after holding the article at 350° C. for 2 hours.

In another example of the first and/or second aspects, a change in percent blister area of the modification layer is less than 3% after holding the article at 350° C. for 2 hours.

In another example of the first and/or second aspects, the change in percent blister area of the modification layer is less than 1%.

In yet another example of the first and/or second aspects, the change in percent blister area of the modification layer is less than 0.1%.

In another example of the first aspect, a change in percent blister area of the modification layer is less than 3% after holding the article at 370° C. for 30 minutes.

In another example of the first and/or second aspects, the average thickness of the second sheet is equal to or less than about 300 microns.

In another example of the first and/or second aspects, the average thickness of the second sheet is less than an average thickness of the first sheet.

In yet another example of the first and/or second aspects, the average thickness of the first sheet is equal to or greater than about 200 microns.

In a third aspect there is a method of making an article comprising forming a modification layer on a bonding surface of a first sheet by depositing at least one cationic surfactant onto the bonding surface of the first sheet, wherein the modification layer comprises a modification layer bonding surface. The modification layer bonding surface is then bonded to the bonding surface of a second sheet.

In a fourth aspect there is a method of making an article comprising forming a modification layer on a bonding surface of a first sheet by depositing at least one organic salt onto the bonding surface of the first sheet, wherein the modification layer comprises a modification bonding layer bonding surface. The method further comprises the step of bonding the modification layer bonding surface to the bonding surface of a second sheet.

In an example of the either or both of the third and/or fourth aspects, the method further comprises the step of debonding at least a portion of the modification layer bonding surface from the bonding surface of the first sheet and/or the second sheet.

In an example of the third aspect, the cationic surfactant comprises a head group comprising a charged nitrogen selected from the group consisting of primary, secondary, tertiary, or quaternary ammonium, pyridinium, and combinations thereof.

In another example of the third aspect, the cationic surfactant is selected from the group consisting of cetyltrimethylammonium bromide, cetylpyridinium chloride, octyltrimethylammonium bromide, and 1-butylpyridinium chloride In another example of either the third aspect, the method further comprises the step of treating the first sheet and/or the second sheet with $O_2$ plasma prior to depositing the cationic surfactant.

In another example of the third aspect, method further comprises the step of washing the first sheet and/or second sheet prior to depositing the cationic surfactant.

In another example of the third aspect, the method further comprises the step of washing the first sheet following deposition of the cationic surfactant.

In another example of the fourth aspect, the organic salt comprises an ammonium group.

In yet another example of the fourth aspect, the organic salt comprises a phosphonium ion.

In another example of the fourth aspect, the organic salt is selected from the group consisting of tetramethylammonium bromide, tetraethylammonium bromide, and tetraphenylphosphonium chloride.

In another example of the fourth aspect, the method further comprises the step of treating the first sheet and/or the second sheet with $O_2$ plasma prior to depositing the organic salt.

In yet another example of the fourth aspect, the method further comprises the step of washing the first sheet and/or second sheet prior to depositing the organic salt.

In another example of the fourth aspect, the method further comprises the step of washing the first sheet following deposition of the organic salt.

In another example of the third and/or fourth aspects, the method further comprises a drying step.

In another example of the third aspect, the cationic surfactant is deposited by spin coating, dip coating or spray coating.

In another example of the third aspect, the cationic surfactant is deposited as an aqueous solution.

In yet another example of the third aspect, the aqueous solution of cationic surfactant comprises a surfactant concentration of from 0.001 mM to 3.0 mM.

In another example of the third aspect, the surfactant concentration is less than 0.5 mM.

In another example of the third aspect, the surfactant concentration is less than 0.1 mM.

In another example of the third aspect, the aqueous solution of cationic surfactant is substantially free of organic solvent.

In another example of the fourth aspect, the organic salt is deposited by spin coating, dip coating or spray coating.

In another example of the fourth aspect, the organic salt is deposited as an aqueous solution.

In another example of the fourth aspect, the aqueous solution comprises a concentration of the organic salt from 0.001 mM to 3.0 mM.

In another example of the fourth aspect, the organic salt concentration is less than 0.5 mM.

In another example of the fourth aspect, the organic salt concentration is less than 0.1 mM.

In another example of the fourth aspect, the aqueous solution of organic salt is substantially free of organic solvent.

In yet another example of the third and/or fourth aspect, the modification layer comprises an average thickness of from about 0.1 nm to about 10 nm.

BRIEF DESCRIPTION OF THE DRAWINGS

The above and other features, examples and advantages of aspects or examples of the present disclosure are better understood when the following detailed description is read with reference to the accompanying drawings, in which.

DETAILED DESCRIPTION

Figure 1:
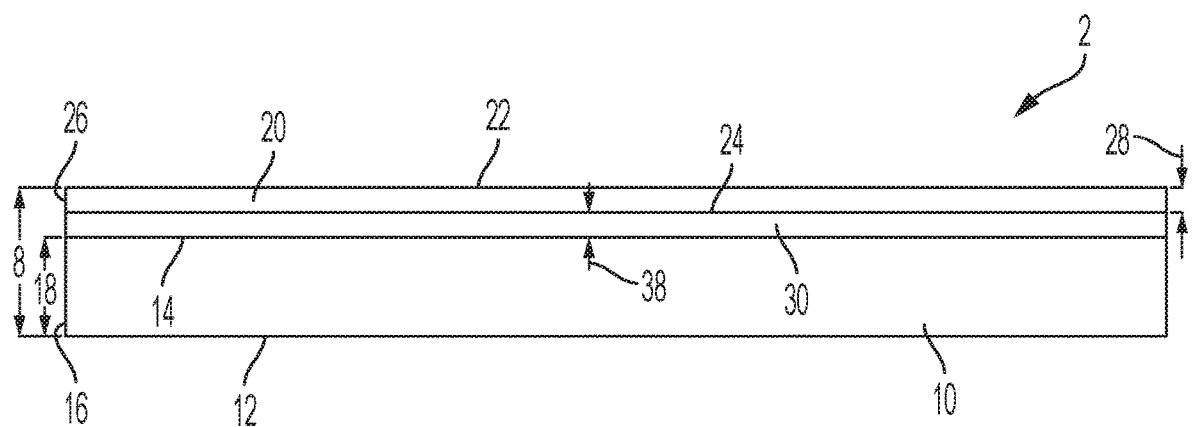
FIG. 1 is a schematic side view of an article having first sheet bonded to a second sheet with a modification layer there between, according to some embodiments.

Example embodiments will now be described more fully hereinafter with reference to the accompanying drawings in which example embodiments are shown. Whenever possible, the same reference numerals are used throughout the drawings to refer to the same or like parts. However, the embodiments may take on many different forms and should not be construed as limited to those specifically set forth herein. These example embodiments are provided so that this disclosure will be both thorough and complete, and will fully convey the scope of the claims to those skilled in the art.

Directional terms as used herein (e.g., up, down, right left, front, back, top, bottom) are made only with reference to the figures as drawn and are not intended to imply absolute orientation.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "free of" or "substantially free of $B_2O_3$," for example, is one in which $B_2O_3$ is not actively added or batched into the glass, but may be present in very small amounts (e.g., <0.001 mol %) as a contaminant. Similar to $B_2O_3$, other components, such as a compound being "free of" or "substantially free of" oxygen, may be characterized in the same manner.

Provided are solutions for allowing the processing of a first sheet coupled to a second sheet, whereby at least portions of the second sheet, for example, a thin sheet or a thin glass sheet, remain non-permanently bonded so that after devices (for example TFTs) are processed onto the thin sheet and the thin sheet may be removed from the first sheet, for example, a carrier. In order to maintain advantageous surface shape characteristics, the carrier is typically a display grade glass substrate, for example Corning® EAGLE XG® (available from Corning Incorporated, Corning, N.Y.) alkali-free display glass. Accordingly, in some situations, it may be wasteful and expensive to merely dispose of the carrier after one use. Thus, in order to reduce costs of display manufacture, it is desirable to be able to reuse the carrier to process more than one thin sheet substrate. The present disclosure sets forth articles and methods for enabling a thin sheet to be processed through the harsh environment of the processing lines—such as a-Si or ox-TFT, including high temperature processing, wherein high temperature processing is processing at a temperature ≥about 200° C., ≥about 300° C., ≥about 400° C., and up to about 500° C., and wherein the processing temperature may vary depending upon the type of device being made—and yet still allow the thin sheet to be easily removed from the carrier without damage (for example, wherein one of the carrier and the thin sheet breaks or cracks into two or more pieces) to the thin sheet or carrier, whereby the carrier may be reused. The articles and methods of the present disclosure can be applied to other high-temperature processing, for example, processing at a temperature in the range of 200° C. to 500° C., and yet still allow the thin sheet to be removed from the carrier without significantly damaging the thin sheet.

Figure 2:
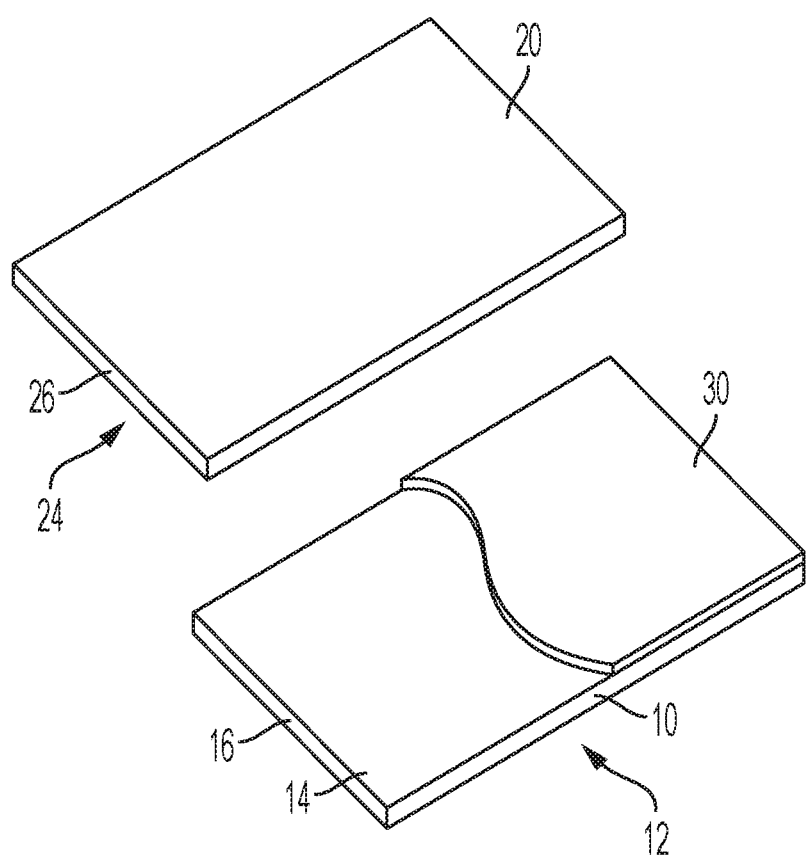
FIG. 2 is an exploded and partially cut-away view of the article in FIG. 1.

As shown in FIGS. 1 and 2, an article 2, for example a glass article, has a thickness 8, and includes a first sheet 10 (for example a carrier) having a thickness 18, a second sheet 20 (e.g., a thin glass sheet) having a thickness 28, and a modification layer 30 having a thickness 38. The average thickness 28 of the thin sheet 20 may be, for example, equal to or less than about 300 micrometers (μm, or microns), including but not limited to thicknesses of, for example, about 10 to about 50 micrometers, about 50 to about 100 micrometers, about 100 to about 150 micrometers, about 150 to about 300 micrometers, about 300 micrometers, about 250 micrometers, about 200 micrometers, about 190 micrometers, about 180 micrometers, about 170 micrometers, about 160 micrometers, about 150 micrometers, about 140 micrometers, about 130 micrometers, about 120 micrometers, about 110 micrometers, about 100 micrometers, about 90 micrometers, about 80 micrometers, about 70 micrometers, about 60 micrometers, about 50 micrometers, about 40 micrometers, about 30 micrometers, about 20 micrometers, or about 10 micrometers.

The article 2 is arranged to allow the processing of thin sheet 20 in equipment designed for thicker sheets, for example, those having an average thickness on the order of greater than or equal to about 0.4 mm, for example about 0.4 mm, about 0.5 mm, about 0.6 mm, about 0.7 mm, about 0.8 mm, about 0.9 mm, or about 1.0 mm, although the thin sheet 20 itself is equal to or less than about 300 micrometers. The thickness 8 of the article 2, which is the sum of thicknesses 18, 28, and 38, can be equivalent to that of the thicker sheet for which a piece of equipment, for example equipment designed to dispose electronic device components onto substrate sheets, was designed to process. In an example, if the processing equipment was designed for a 700 micrometer sheet, and the thin sheet had a thickness 28 of about 300 micrometers, then thickness 18 would be selected as about 400 micrometers, assuming that thickness 38 is negligible. That is, the modification layer 30 is not shown to scale, but rather it is greatly exaggerated for sake of illustration only. Additionally, in FIG. 2, the modification layer 30 is shown in cut-away. The modification layer can be disposed uniformly, or substantially uniformly, over the bonding surface 14 when providing a reusable carrier. The modification layer 30 can also be disposed over a portion of the bonding surface 14, such as when the modification layer 30 is present as a monolayer or sub-monolayer.

Typically, the average thickness 38 of the modification layer will be on the order of nanometers (nm), for example from about 0.1 nm to about 1 micrometers (microns or μm or um), from about 1 nm to about 100 nm, or from about 2 nm to about 50 nm, or about 3 nm, about 4 nm, about 5 nm, about 10 nm, about 20 nm, about 30 nm, or about 40 nm. In another example, thickness 38 can be less than about 10 nm, about 8 nm, about 6 nm, about 5 nm, about 4 nm, about 3 nm, about 2 nm, about 1 nm or less than about 1 nm. The presence of a modification layer may be detected by surface chemistry analysis, for example by time-of-flight secondary ion mass spectrometry (ToF SIMS) or X-ray photoelectron spectroscopy (XPS).

First sheet 10, which may be used as a carrier, for example, has a first surface 12, a bonding surface 14, and a perimeter 16. The first sheet 10 may be of any suitable material including glass. The first sheet can be a non-glass material, for example, ceramic, fused silica, glass-ceramic, silicon, metal, or combinations thereof (as the surface energy and/or bonding may be controlled in a manner similar to that described below in connection with a glass carrier). If made of glass, first sheet 10 may be of any suitable composition including alumino-silicate, boro-silicate, alumino-boro-silicate, soda-lime-silicate, and may be either alkali containing or alkali-free depending upon its ultimate application. Further, in some examples, when made of glass, glass-ceramic, or other material, the first bonding surface can be made of a coating or layer of metal material disposed on the underlying bulk material of the first sheet. Thickness 18 may be from about 0.2 to about 3 mm, or greater, for example about 0.2 mm, about 0.3 mm, about 0.4 mm, about 0.5 mm, about 0.6 mm, about 0.65 mm, about 0.7 mm, about 1.0 mm, about 2.0 mm, or about 3.0 mm, or greater, and will depend upon the thickness 28, and thickness 38 when thickness 38 is non-negligible, as noted above. The average thickness 18 of the first sheet 10 in some embodiments may be greater than the thickness 28 of the thin sheet 20. In some embodiments, thickness 18 may be less than thickness 28. In some embodiments, the first sheet 10 may be made of one layer, as shown, or multiple layers (including multiple thin sheets) that are bonded together. Further, the first sheet may be of a Gen 1 size or larger, for example, Gen 2, Gen 3, Gen 4, Gen 5, Gen 8 or larger (e.g., sheet sizes from about 100 mm×100 mm to about 3 meters×3 meters or greater).

The thin sheet 20 has a first surface 22, a bonding surface 24, and a perimeter 26. Perimeters 16 (first sheet) and 26 (thin sheet) may be of any suitable shape, may be the same as one another, or may be different from one another. Further, the thin sheet 20 may be of any suitable material including glass, ceramic, glass-ceramic, silicon, metal or combinations thereof. As described above for the first sheet 10, when made of glass, thin sheet 20 may be of any suitable composition, including alumino-silicate, boro-silicate, alumino-boro-silicate, soda-lime-silicate, and may be either alkali containing or alkali-free depending upon its ultimate application. The coefficient of thermal expansion of the thin sheet can be matched substantially the same with that of the first sheet to reduce any warping of the article during processing at elevated temperatures. The average thickness 28 of the thin sheet 20 is about 300 micrometers or less, as noted above, such as about 200 micrometers or about 100 micrometers. Further, the thin sheet may be of a Gen 1 size or larger, for example, Gen 2, Gen 3, Gen 4, Gen 5, Gen 8 or larger (e.g., sheet sizes from about 100 mm×100 mm to about 3 meters×3 meters or greater).

The article 2 can have a thickness that accommodates processing with existing equipment, and likewise it can survive the harsh environment in which the processing takes place. For example, thin film transistor (TFT) processing may be carried out at high temperature (e.g., ≥about 200° C., ≥300° C., ≥400° C., and up to less than 500° C.). Processing of low-temperature poly-silicon (LTPS) may reach temperatures up to 600° C. For a-Si and ox-TFT processes, as noted above, the temperature may be ≥about 300° C., ≥about 350° C., ≥about 400° C., and up to about 500° C., including any ranges and subranges there between.

To survive the harsh environment in which article 2 will be processed, the bonding surface 14 should be bonded to bonding surface 24 with sufficient strength so that the thin sheet 20 does not spontaneously separate from first sheet 10. This strength should be maintained throughout the processing so that sheet 20 does not separate from sheet 10 during processing. Further, to allow sheet 20 to be removed from sheet 10 (so that a carrier may be reused, for example), the bonding surface 14 should not be bonded to bonding surface 24 too strongly either by the initially designed bonding force, and/or by a bonding force that results from a modification of the initially designed bonding force as may occur, for example, when the article 2 undergoes processing at high temperatures, e.g., temperatures of ≥about 200° C., ≥about 300° C., ≥about 400° C., and up to about 500° C. The modification layer 30 may be used to control the strength of bonding between bonding surface 14 and bonding surface 24 so as to achieve both of these objectives by controlling the contributions of van der Waals (and/or hydrogen bonding) and covalent attractive energies between the modification layer 30 and the first sheet 10 and/or second sheet 20. This controlled bonding is strong enough to survive ox-TFT, for instance, including temperatures ≥about 200° C., ≥about 300° C., ≥about 400° C. and up to about 500° C., and remain debondable by application of a force sufficient to separate the sheets but not cause significant damage to sheet 20 and/or sheet 10. For example, the applied force should not break either sheet 20 or sheet 10. Such debonding permits removal of sheet 20 and the devices fabricated thereon, and also allows for reuse of sheet 10 as a carrier.

Although the modification layer 30 is shown as a solid layer between sheet 20 and sheet 10, such need not be the case. For example, the layer 30 may be on the order of about 0.1 nm to about 1 micrometer thick (e.g., about 1 nm to about 10 nm, about 10 nm to about 50 nm, about 50 nm to about 100 nm, about 250 nm, about 500 nm to about 1 micrometer), and may not completely cover the entire portion of the bonding surface 14. For example, the coverage on bonding surface 14 may be ≤about 100%, from about 1% to about 100%, from about 10% to about 100%, from about 20% to about 90%, or from about 50% to about 90% of the bonding surface 14, including any ranges and subranges there between. In some embodiments, the modification layer 30 is a sub-monolayer. In other embodiments, the modification layer 30 is a monolayer or substantially a monolayer. In other embodiments, the layer 30 may be about 3 nm thick, or in other embodiments 5 nm, 10 nm or even up to about 50 nm to about 100 nm thick. The modification layer 30 may be considered to be disposed between sheet 10 and sheet 20 even though it may not contact one or the other of sheet 10 and sheet 20. In other embodiments, the modification layer 30 modifies the ability of the bonding surface 14 to bond with bonding surface 24, thereby controlling the strength of the bond between the sheet 10 and sheet 20. The material and thickness of the modification layer 30, as well as the treatment of the bonding surfaces 14, 24 prior to bonding, can be used to control the strength of the bond (energy of adhesion) between sheet 10 and sheet 20.

Deposition of the Modification Layer

The present disclosure employs cationic surfactants, organic salts, or combinations thereof, to provide modification layers 30 as described herein. As used herein, surfactants are amphiphilic surface active agents having a hydrophilic head and one or more hydrophobic tails. The hydrophobic tails of the surfactants used according to the present disclosure comprise a hydrocarbon chain having from four carbons to at least 24 carbons (C4-$C_{24}$). The hydrocarbon chains can be saturated or unsaturated and can be straight, branched or aromatic. We have previously disclosed the use of nonionic surfactants as modification layers (WO 2017/087745A1, herein incorporated by reference), but it has now been surprisingly found that cationic surfactants can not only form modification layers demonstrating excellent removability and blistering properties, but that at least some cationic surfactants may also result in modification layers 30 on the sub-monolayer scale that still maintain the desirable strong temporary binding interactions and removability after high temperature processing. Thus, the hydrophilic head groups according to the present disclosure are preferably cationic head groups, i.e. head groups having a cationic functional group. Cationic nitrogen-containing head groups can include primary, secondary, tertiary or quaternary ammonium groups, pyridinium, pyrrolinium, imidazolium, guanidinium cations, or any other nitrogen-containing cation suitable for use as a surfactant head group. Other cations, such as phosphonium or sulfonium can also form suitable cationic head groups.

Organic salts as used herein can include any salt comprising an organic ion. Preferred organic salts according to the disclosure contain organic cations, such as nitrogen-containing cations, including but not limited to primary, secondary, tertiary or quaternary ammonium groups, pyridinium, pyrrolinium, imidazolium, and guanidinium cations. Other organic cations suitable for use as organic salts can also be used.

One of the advantages of the cationic surfactants and/or organic salts used in according to the present disclosure is that such compounds can be applied through a simple, one-step processing to enable spontaneous bonding between the carrier and the thin sheet at room temperature whenever possible. The electrostatic interactions between the negative (at neutral pH) glass surface and the cationic surfactants or organic salts enable fast adsorption of the molecules to the glass surface which is beneficial for high throughput processing. In addition, the glass surface coated or partially coated with a cationic surfactant or organic salt will remain highly hydrophilic and have a high surface energy matching, or nearly matching, that of bare glass (approximately 50-75 $mJ/m^2$). This obviates the need for pressure lamination to bond the surfaces or for energy-enhancing plasma treatment to increase the surface energy of the modification layer as is often done with organic polymers. Pressure lamination can still be used as needed or as desired.

Because of their highly hydrophilic and water soluble nature, cationic surfactants and organic salts allow for simplified application onto the first and/or second sheets. An aqueous solution of the compound can be made and then the first and/or second sheets can be treated by a variety of simple dispensing methods, such as spin coating, dip coating, spray coating, and combinations thereof. Aqueous processing also advantageously avoids the need for organic solvents, thereby decreasing the cost and environmental impact.

Surface Energy of the Modification Layer

As referred to herein, the surface energy of the modification layer is a measure of the surface energy of the modification layer as it exists on the carrier or on the thin sheet. In general, the surface energy of the modification layer 30 can be measured upon being deposited and/or further treated, for example by activation with nitrogen or a mixture of nitrogen and oxygen. The surface energy of the solid surface is measured indirectly by measuring the static contact angles of three liquids—water, diiodomethane and hexadecane—individually deposited on the solid surface in air. Surface energies as disclosed herein were determined according to the Wu model, as set forth below. (See: S. Wu, J. Polym. Sci. C, 34, 19, 1971). In the Wu model, the surface energies, including total, polar, and dispersion components, are measured by fitting a theoretical model to three contact angles of three test liquids: water, diiodomethane and hexadecane. From the contact angle values of the three liquids, a regression analysis is done to calculate the polar and dispersion components of the solid surface energy. The theoretical model used to calculate the surface energy values includes the following three independent equations relating the three contact angle values of the three liquids and the dispersion and polar components of surface energies of the solid surface as well as the three test liquids $$\gamma_W(1+\cos\theta_W) = 4\left(\frac{\gamma_W^d \gamma_S^d}{\gamma_W^d + \gamma_S^d} + \frac{\gamma_W^p \gamma_S^p}{\gamma_W^p + \gamma_S^p}\right) \quad (1)$$

$$\gamma_D(1+\cos\theta_D) = 4\left(\frac{\gamma_D^d \gamma_S^d}{\gamma_D^d + \gamma_S^d} + \frac{\gamma_D^p \gamma_S^p}{\gamma_D^p + \gamma_S^p}\right) \quad (2)$$

$$\gamma_H(1+\cos\theta_H) = 4\left(\frac{\gamma_H^d \gamma_S^d}{\gamma_H^d + \gamma_S^d} + \frac{\gamma_H^p \gamma_S^p}{\gamma_H^p + \gamma_S^p}\right) \quad (3)$$

where, the subscripts "W", "D" and "H" represent water, diiodomethane and hexadecane, respectively, and the superscripts "d" and "p" represent the dispersion and polar components of surface energies, respectively. Since diiodomethane and hexadecane are essentially non-polar liquids, the above set of equations reduces to:

$$\gamma_W(1+\cos\theta_w) = 4\left(\frac{\gamma_W^d \gamma_S^d}{\gamma_W^d + \gamma_S^d} + \frac{\gamma_W^p \gamma_S^p}{\gamma_W^p + \gamma_S^p}\right) \quad (4)$$

$$\gamma_D(1+\cos\theta_D) = 4\left(\frac{\gamma_D^d \gamma_S^d}{\gamma_D^d + \gamma_S^d}\right) \quad (5)$$

$$\gamma_H(1+\cos\theta_H) = 4\left(\frac{\gamma_H^d \gamma_S^d}{\gamma_H^d + \gamma_S^d}\right) \quad (6)$$

From the above set of three equations (4-6), the two unknown parameters, dispersion and polar surface energy components of the solid surface, $\gamma_s^d$ and $\gamma_s^p$ can be calculated by regression analysis. However, with this approach, there is a limiting maximum value up to which the surface energy of the solid surface could be measured. That limiting maximum value is the surface tension of water, which is about 73 mJ/m². If the surface energy of the solid surface is appreciably greater than the surface tension of water, the surface will be fully wetted by water, thereby causing the contact angle to approach zero. Beyond this value of surface energy, therefore, all calculated surface energy values would correspond to about 73-75 mJ/m² regardless of the real surface energy value. For example, if the real surface energies of two solid surfaces are 75 mJ/m² and 150 mJ/m², the calculated values using the liquid contact angles will be about 75 mJ/m² for both surfaces.

Accordingly, all contact angles disclosed herein are measured by placing liquid droplets on the solid surface in air and measuring the angle between the solid surface and the liquid-air interface at the contact line. Therefore, when a claim is made on the surface energy value being from 55 mJ/m² to 75 mJ/m² it should be understood that these values correspond to calculated surface energy values based on the method described above and not the real surface energy values, which could be greater than 75 mJ/m² when the calculated value approaches the real surface energy value.

Bonding Energy of the Second or Thin Sheet to the Modification Layer

As referred to herein, the bond energy of the modification layer is a measure of the force coupling the thin sheet and the carrier. In general, the energy of adhesion (i.e., bond energy) between two surfaces can be measured by a double cantilever beam method or wedge test. The tests simulate in a qualitative manner the forces and effects on an adhesive bond joint at the interface between modification layer 30 and second sheet 20. Wedge tests are commonly used for measuring bonding energy. For example, ASTM D5041, Standard Test Method for Fracture Strength in Cleavage of Adhesives in Bonded Joints, and ASTM D3762, Standard Test Method for Adhesive-Bonded Surface Durability of Aluminum, are standard test methods for measuring bonding of substrates with a wedge.

A summary of the test method for determining bond energies as disclosed herein, based on the above-noted ASTM methods, includes recording of the temperature and relative humidity under which the testing is conducted, for example, that in a lab room. The second sheet is gently pre-cracked or separated at a corner of the glass article to break the bond between the first sheet and the second sheet. A sharp razor is used to pre-crack the second sheet from the first sheet, for example, a GEM brand razor with a thickness of about 95 microns. In forming the pre-crack, momentary sustained pressure may be used to fatigue the bond. A flat razor having the aluminum tab removed is slowly inserted until the crack front can be observed to propagate such that the crack and separation increases. The flat razor does not need to be inserted significantly to induce a crack. Once a crack is formed, the glass article is permitted to rest for at least 5 minutes to allow the crack to stabilize. Longer rest times may be used for high humidity environments, for example, above 50% relative humidity.

The glass article with the developed crack is evaluated with a microscope to record the crack length. The crack length is measured from the end separation point of the second sheet from the first sheet (i.e. furthest separation point from the tip of razor) and the closest non-tapered portion of the razor. The crack length is recorded and used in the following equation to calculate bond energy.

$$\gamma = 3t_b^2 E_1 t_{w1}^3 E_2 t_{w2}^3 / 16 L^4 (E_1 t_{w1}^3 + E_2 t_{w2}^3) \quad (7)$$

wherein $\gamma$ represents the bond energy, $t_b$ represents the thickness of the blade, razor or wedge, $E_1$ represents the Young's modulus of the first sheet 10 (e.g., a glass carrier), $t_{w1}$ represents the thickness of the first sheet, $E_2$ represents the Young's modulus of the second sheet 20 (e.g., a thin glass sheet), $t_{w2}$ represents the thickness of the second sheet 20 and L represents the crack length between the first sheet 10 and second sheet 20 upon insertion of the blade, razor or wedge as described above.

The bond energy is understood to behave as in silicon wafer bonding, where an initially hydrogen bonded pair of wafers are heated to convert much or all the silanol-silanol hydrogen bonds to Si—O—Si covalent bonds. While the initial room temperature hydrogen bonding produces bond energies on the order of about 100-200 mJ/m² which allows separation of the bonded surfaces, a fully covalently bonded wafer pair as achieved during processing on the order of about 300 to about 800° C. has an adhesion energy of about 2000 to about 3000 mJ/m², which does not allow separation of the bonded surfaces; instead, the two wafers act as a monolith. On the other hand, if both the surfaces are perfectly coated with a low surface energy material, for example a fluoropolymer, with a thickness large enough to shield the effect of the underlying substrate, the adhesion energy would be that of the coating material and would be very low, leading to low or no adhesion between the bonding surfaces 14, 24. Accordingly, the thin sheet 20 would not be able to be processed on sheet 10 (for example a carrier) without failure of the bond and potential damage to the thin sheet 20. Consider two extreme cases: (a) two standard clean 1 (SC1, as known in the art) cleaned glass surfaces saturated with silanol groups bonded together at room temperature via hydrogen bonding (whereby the adhesion energy is about 100 to about 200 mJ/m$^2$) followed by heating to a temperature that converts the silanol groups to covalent Si—O—Si bonds (whereby the adhesion energy becomes about 2000 to about 3000 mJ/m$^2$). This latter adhesion energy is too high for the pair of glass surfaces to be detachable; and (b) two glass surfaces perfectly coated with a fluoropolymer with low surface adhesion energy (about 12 to about 20 mJ/m$^2$ per surface) bonded at room temperature and heated to high temperature. In this latter case (b), not only do the surfaces not bond at low temperature (because the total adhesion energy of from about 24 to about 40 mJ/m$^2$, when the surfaces are put together, is too low), they do not bond at high temperature either as there are too few polar reacting groups. Between these two extremes, a range of adhesion energies exist, for example between about 50 to about 1000 mJ/m$^2$, which can produce the desired degree of controlled bonding. Accordingly, the inventors have found various methods of providing a modification layer 30 leading to a bonding energy between these two extremes, and such that there can be produced a controlled bonding sufficient to maintain a pair of substrates (for example a glass carrier or sheet 10 and a thin glass sheet 20) bonded to one another through the rigors of a-Si or ox-TFT processing but also of a degree that (even after high temperature processing of, e.g. ≥about 200° C., ≥about 300° C., ≥about 400° C., and up to about 500° C.) allows the detachment of sheet 20 from sheet 10 after processing is complete. Moreover, the detachment of the sheet 20 from sheet 10 can be performed by mechanical forces, and in such a manner that there is no significant damage to at least sheet 20, and preferably also so that there is no significant damage to sheet 10.

An appropriate bonding energy can be achieved by using select surface modifiers, i.e., modification layer 30, and/or thermal treatment of the surfaces prior to bonding. The appropriate bonding energy may be attained by the choice of chemical modifiers of either one or both of bonding surface 14 and bonding surface 24, which chemical modifiers control both the van der Waals (and/or hydrogen bonding, as these terms are used interchangeably throughout the specification) adhesion energy as well as the likely covalent bonding adhesion energy resulting from high temperature processing (e.g., on the order of ≥about 200° C., ≥about 300° C., ≥about 400° C., and up to about 500° C.).

Production of the Article

In order to produce the article, for example a glass article 2, the modification layer 30 is formed on one of the sheets, preferably the first sheet 10 (for example, a carrier). If desired, the modification layer 30 can be subjected to steps such as surface activation and annealing in order increase the surface energy, decrease outgassing during processing and improve the bonding capabilities of the modification layer 30, as described herein. In order to bond the other sheet, for example thin sheet 20, the other sheet is brought into contact with the modification layer 30. If the modification layer 30 has a high enough surface energy, introducing the other sheet to the modification layer 30 will result in the other sheet being bonded to the modification layer 30 via a self-propagating bond. Self-propagating bonds are advantageous in reducing assembly time and/or cost. However, if a self-propagating bond does not result, the other sheet can be bonded to the modification layer 30 using additional techniques, such as lamination, for example by pressing the sheets together with rollers, or by other techniques, as known in the lamination art for bringing two pieces of material together for bonding.

It has been found that an article including a first sheet 10 and a second sheet 20 (for example a carrier and a thin sheet), suitable for a-Si or ox-TFT processing (including processing at temperatures of about 200° C., 300° C., 400° C., and up about 500° C.), can be made by coating the first sheet 10 and/or second sheet 20 with cationic surfactant and/or organic salt. The cationic surfactants and organic salts according to the present disclosure can include any cationic polymer or organic salt that is as thermally stable as possible and that is suitable for a liquid- or solution-based surface treatment/coating process. In particular, cationic surfactants and organic salts that are water soluble are particularly preferred. Preferred cations for both the head group of the cationic surfactant and for the cation of the organic salt can include primary, secondary, tertiary or quaternary ammonium groups, pyridinium, pyrrolinium, imidazolium, guanidinium cations, or any other nitrogen-containing cation. A wide range of ammonium cations are particularly preferred, especially quaternary ammonium cations. Other suitable cations include phosphonium or sulfonium-based cations. In some embodiments, the cationic polymer and/or organic salt is free, or substantially free, of oxygen.

In one example, the modification layer 30 can be formed by the deposition of a cationic surfactant comprising an ammonium cation. The ammonium cation can be a primary, secondary, tertiary or quaternary ammonium cation. In the cases of a secondary, tertiary or quaternary ammonium cation, the nitrogen can be independently substituted with a wide variety of substituents, including but not limited to alkyl, vinyl, allyl or amino, and glycidyl. Each substituent can be further substituted, unsubstituted, protected, or unprotected. Where an alkyl substituent is selected, the substituent may be branched or unbranched, saturated or unsaturated. Examples of alkyl groups include methyl, ethyl, n-propyl, iso-propyl, n-butyl, iso-butyl, tert-butyl, n-hexyl, n-decyl, tetradecyl, and the like. Methyl and ethyl substitution is particularly preferred. In one example, the cationic surfactant can be cetyltrimethylammonium bromide (CTAB) (I), or other comparable salt or derivative thereof. In another example, the cationic surfactant can be octyltrimethylammonium bromide (OTAB) (II), or other comparable salt or derivative thereof.

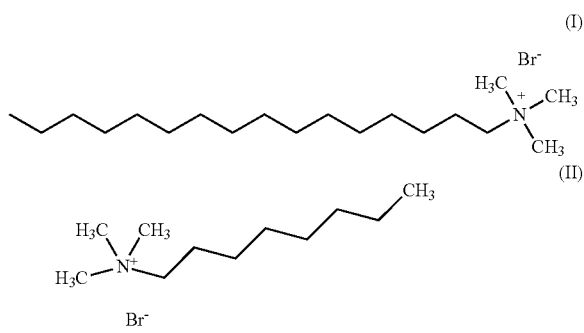

In another example, the modification layer 30 can be formed by the deposition of a cationic surfactant comprising a pyridinium cation. As described above, the aromatic ring of the pyridine can further include any suitable number of substituents covalently bonded to one or more of the ring carbons and/or the nitrogen, and can be independently selected from H, alkyl, vinyl, allyl, amino, glycidyl, and thiol. Each substituent can be further substituted, unsubstituted, protected, or unprotected. Where an alkyl substituent is selected, the substituent may be branched or unbranched, saturated or unsaturated. Examples of alkyl groups include methyl, ethyl, n-propyl, iso-propyl, n-butyl, iso-butyl, tert-butyl, n-hexyl, n-decyl, tetradecyl, and the like. Preferred examples of cationic surfactants containing pyridinium cations include cetylpyridinium chloride (CPCl) (III) and 1-butylpyridinium chloride (BPCl) (IV) or other comparable salts or derivatives thereof.

In yet another example, the modification layer 30 can be formed by the deposition of an organic salt comprising a phosphonium cation. The phosphonium cation can be a primary, secondary, tertiary or quaternary phosphonium cation. In the cases of a secondary, tertiary or quaternary phosphonium cation, the phosphorus can be substituted with a wide variety of substituents, independently selected from H, alkyl, vinyl, allyl, amino, glycidyl, among others. Phenyl substitution is particularly preferred. In one example, the organic salt can be tetraphenylphosphonium chloride (TPhPCl) (VII) or other comparable salt or derivative thereof.

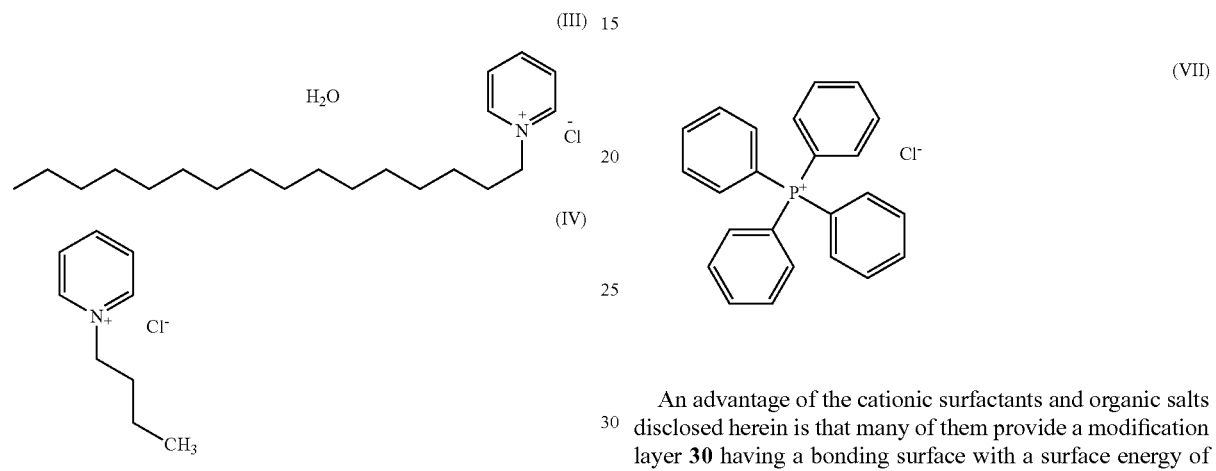

In yet another example, the modification layer 30 can be formed by the deposition of an organic salt comprising an ammonium cation. Like the cationic surfactants described above, the ammonium cation of the organic salt can be a primary, secondary, tertiary or quaternary ammonium cation. In the cases of a secondary, tertiary or quaternary ammonium cation, the nitrogen can be substituted with a wide variety of substituents, including but not limited to alkyl, vinyl, allyl or amino, and glycidyl. The substituents can be the same or different. Each substituent can be further substituted, unsubstituted, protected, or unprotected. Where an alkyl substituent is selected, the substituent may be branched or unbranched, saturated or unsaturated. Examples of alkyl groups include methyl, ethyl, n-propyl, iso-propyl, n-butyl, iso-butyl, tert-butyl, n-hexyl, n-decyl, tetradecyl, and the like. Methyl and ethyl substitution is particularly preferred. In particularly preferred examples, the organic salt can be tetramethylammonium bromide (TMAB) (V) or tetraethylammonium bromide (TEAB) (VI), or other comparable salts or derivatives thereof An advantage of the cationic surfactants and organic salts disclosed herein is that many of them provide a modification layer 30 having a bonding surface with a surface energy of greater than about 50 mJ/m$^2$, greater than about 55 mJ/m$^2$, greater than about 60 mJ/m$^2$, greater than about 65 mJ/m$^2$, or greater than about 70 mJ/m$^2$, as measured for one surface (including polar and dispersion components), which is sufficiently high to spontaneously bond with the glass surface via a self-propagating wave as described above. Bare glass has a surface energy >75 mJ/m$^2$ as measured by contact angle. In some cases, the cationic surfactant or organic salt may provide a surface that produces weak bonding due to a lower than optimal surface energy. Similarly, when a surface other than glass is used, it may be desirable to increase the surface energy of the bonding surface prior to bonding. In other words, the desired surface energy for bonding may not be the surface energy of the initially deposited cationic surfactant or organic salt intended to provide the modification layer 30. In order to increase the surface energy when desired, the deposited layer may be further treated. As initially deposited, and without further processing, the modification layer 30 can show good thermal stability, however, may not be sufficient to promote good, temporary bonding to the thin sheet 20. Because these surface energies may be low to promote temporary bonding to bare glass or to other desirable surfaces, surface activation of the modification layer 30 may be used to promote bonding. If necessary, surface energy of the deposited modification layers can be raised to about or greater than 70 mJ/m$^2$ for glass bonding by plasma exposure to $N_2$, $N_2$—$H_2$, $N_2$—$O_2$, $NH_3$, $N_2H_4$, $HN_3$, $CO_2$, or mixtures thereof. The energy (after plasma treatment) may be high enough that the two surfaces 10, 20 bond one another, via the modification layer 30, with a self-propagating bond. Table 1 reports the measured contact angles for CTAB deposited by spin-coating of various concentrations of aqueous surfactant solution on a carrier glass sheet.

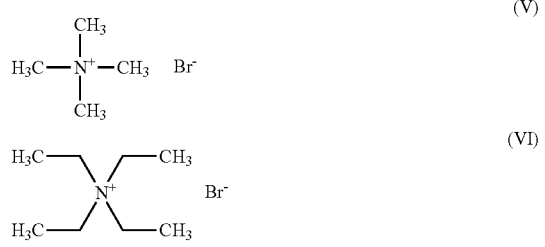

TABLE 1

Contact Angles of an exemplary CTAB Spin-Coated Layer

| Concentration (mM) | DI water (degrees) | HD (degrees) | DIM (degrees) |
|---|---|---|---|
| 0.5 | 61.5 | 6.02 | 54.92 |
| 0.3 | 62.38 | 7.06 | 46.08 |
| 0.1 | 63.3 | 10.32 | 46.08 |
| 0.075 | 68.62 | 12.28 | 50.04 |
| 0.05 | 60.52 | 13.83 | 44.2 |
| 0.01 | 57.75 | 20.13 | 32.7 |

Table 2 reports the measured contact angles for spin-coating varying concentrations of TEAB onto a glass carrier sheet.

TABLE 2

Contact Angles of an exemplary TEAB Spin-Coated Layer

| Concentration (mM) | DI water (degrees) | HD (degrees) | DIM (degrees) |
|---|---|---|---|
| 1.5 | 2.6 | 25 | 28.53 |
| 1.0 | 2.83 | 25.5 | 28.4 |
| 0.6 | 2.87 | 27.67 | 29.8 |
| 0.3 | 3.1 | 25.5 | 28.03 |
| 0.1 | 3.0 | 25.97 | 29.27 |

The use of a surface modification layer 30, together with bonding surface preparation as appropriate, can achieve a controlled bonding area, that is a bonding area capable of providing a room-temperature bond between sheet 20 and sheet 10 sufficient to allow the article 2 to be processed in a-Si and ox-TFT type processes, and yet a bonding area that controls covalent bonding between sheet 20 and sheet 10 (even at elevated temperatures) so as to allow the sheet 20 to be removed from sheet 10 (without damage to the sheets) after high temperature processing of the article 2, for example, processing at temperatures of ≥about 200° C., ≥about 300° C., ≥about 400° C., and up to about 500° C. To evaluate potential bonding surface preparations and modification layers with various bonding energies that would provide a reusable carrier suitable for a-Si and ox-TFT processing, a series of tests were used to evaluate the suitability of each. Different applications have different requirements, but ox-TFT processes appear to be among the most stringent at this time. Thus, tests representative of steps in these processes were chosen, as these are desired applications for the article 2. Annealing conditions of about 350° C./2 hour and 370° C./30 minute are used in a-Si and ox-TFT processes, respectfully. Accordingly, the following testing was carried out to evaluate the likelihood that a particular bonding surface preparation and modification layer would allow a thin sheet to remain bonded to a carrier throughout LTPS processing, while allowing the thin sheet to be removed from the carrier (without damaging the thin sheet and/or the carrier) after such processing (including processing at temperatures of about 200° C., about 300° C., about 400° C., and up to about 500° C.).

Thermal Testing of Bond Energy

Surface modification layers can be used to couple a thin sheet to a carrier at room temperature. For example, thin glass can bond very well to cationic surfactant and/or organic salt modification layer bonding surfaces with a high bond speed consistent with the high surface energy. As used herein, a modification layer bonding surface is the surface of the modification layer that will be in contact with the coupled sheet, that is, the thin sheet, following coupling.

The bonding energy of the modification layers to thin sheets, e.g., thin glass sheets, was measured after specific heating conditions. To see whether a particular surface modification layer would allow a thin sheet to remain bonded to a carrier and still allow the thin sheet to be debonded from the carrier after processing, the following tests were carried out.

For thin glass wafers, the article (thin sheet bonded to the carrier via the surface modification layer) was put in a tube furnace or a Rapid Thermal Processing (RTP) chamber that ramped to the desired processing-test temperature at a rate of 4° C. per second. The article was then held in the furnace (maintained at the desired processing-test temperature) for 10 minutes. The furnace was then cooled to about 150° C. within 45 minutes, and the glass article was pulled.

For in-line or Gen 5 (R2S) testing, a typical wash procedure was used without the need to modify in-line facilities. Typical washing includes use of detergents, spinning, rinsing and drying. Instead of using detergents, in some embodiments the cationic surfactant or organic salt solutions at concentrations varying from 0.1 to 0.3 mM was included in the detergent tank and sprayed onto dry glass sheets. A flow average of 25 liters per minutes was applied to draw the cationic surfactant solution to the carrier glass surface. The glass surface was then rinsed with water at a 25 liter per minute flow rate to remove excess surfactant. The treated glass surface was then dried. After drying, the treated carrier was bonded to a thin sheet of Willow® (available from Corning Incorporated, Corning, N.Y.) glass of substantially the same size to create the glass article. After bonding, the initial blister area was measured according to the test described below. The bonded glass was then heated in a heating chamber preheated to 130° C. to 250° C. and held for 2 hours. Alternatively, the bonded glass article was heated to 370° C. and held for 30 min. After holding was complete, the glass article was cooled to room temperature for further testing.

After room temperature bonding, the articles were then thermally tested to determine the bond energy after thermal processing by using the above-described thermal testing of bond energy. The bond energy of thin glass bonded with cationic surfactant modification layers ranged from about 100 to about 750 mJ/m$^2$ after processing the article at temperatures of about 350° C./2 hours and about 370° C./30 minutes. Thus, the cationic surfactant surface modification layers can consistently maintain a bond energy less than about 800 mJ/m$^2$, about 700 mJ/m$^2$, about 600 mJ/m$^2$, about 500 mJ/m$^2$, about 450 mJ/m$^2$, about 400 mJ/m$^2$, about 350 mJ/m$^2$, about 300 mJ/m$^2$, about 250 mJ/m$^2$, or about 200 mJ/m$^2$ with the thin glass sheet even after processing at about 250° C., about 300° C., about 350° C., about 400° C., about 450° C. and up to about 500° C. The bond energy of thin glass bonded with organic salt modification layers ranged from about 200 to about 450 mJ/m$^2$ after processing the article at temperatures of about 350° C./2 hours and about 370° C./30 minutes. Thus, the organic salt modification layers can consistently maintain a bond energy less than about 500 mJ/m$^2$, about 450 mJ/m$^2$, about 400 mJ/m$^2$, about 350 mJ/m$^2$, about 300 mJ/m$^2$, about 250 mJ/m$^2$, or about 200 mJ/m$^2$ with the thin glass sheet even after processing at about 250° C., about 300° C., about 350° C., about 400° C., about 450° C., or up to about 500° C.

Outgassing of the Modification Layer

Polymer adhesives used in typical wafer bonding applications are generally about 10 to about 100 μm thick and lose about 5% of their mass at or near their temperature limit. For such materials, evolved from thick polymer films, it is easy to quantify the amount of mass loss, or outgassing, by mass-spectrometry. On the other hand, it is more challenging to measure the outgassing from thin surface treatments that are on the order of about 0.1 to about 100 nm thick, for example the sub-monolayer surface modification layers described above. For such materials, mass-spectrometry is not sensitive enough and outgassing was measured in a different manner.

In an example test, hereinafter "Outgassing Test", measuring small amounts of outgassing can be based on an assembled article, e.g., one in which a thin sheet is bonded to a carrier via a cationic polymer modification layer, and uses a change in percent blister area to determine outgassing. The Outgassing Test described below was used to measure change in percent blister areas as discussed herein. During heating of the glass article, blisters (also referred to as bubbles or pillowing) can form between the carrier and the thin sheet indicates outgassing of the modification layer. Outgassing results from vaporization of small molecules in the coating as well as thermal decomposition of the coating. Outgassing under the thin sheet may be limited by strong adhesion between the thin sheet and carrier. Nonetheless, layers ≤about 10 nm thick may still create blisters during thermal treatment, despite their smaller absolute mass loss. And the creation of blisters between the thin sheet and carrier may cause problems with pattern generation, photolithography processing, and/or alignment during device processing onto the thin sheet. Additionally, blistering at the boundary of the bonded area between the thin sheet and the carrier may cause problems with process fluids from one process contaminating a downstream process. A change in % blister area of ≥about 5 is significant, indicative of outgassing, and is not desirable. On the other hand a change in % blister area of ≤about 1 is insignificant and an indication that there has been no outgas sing.

The average blister area of bonded thin glass in a Class 1000 clean room with manual bonding is about 1%. The blister percent in bonded carriers is a function of cleanliness of the carrier, thin glass sheet, and surface preparation. Because these initial defects act as nucleation sites for blister growth after heat treatment, any change in blister area upon heat treatment less than about 1% is within the variability of sample preparation. To carry out this Outgassing Test, a commercially available desktop scanner with a transparency unit (Epson Expression 10000XL Photo) is used to make a first scan image of the area bonding the thin sheet and carrier immediately after bonding. The parts are scanned using the standard Epson software using 508 dpi (50 micron/pixel) and 24 bit RGB. The image processing software first prepares an image by stitching together, as necessary, images of different sections of a sample into a single image and removing scanner artifacts (by using a calibration reference scan performed without a sample in the scanner). The bonded area is then analyzed using standard image processing techniques such as thresholding, hole filling, erosion/dilation, and blob analysis. The Epson Expression 11000XL Photo may also be used in a similar manner. In transmission mode, blisters in the bonding area are visible in the scanned image and a value for blister area can be determined. Then, the blister area is compared to the total bonding area (i.e., the total overlap area between the thin sheet and the carrier) to calculate a percent area of the blisters in the bonding area relative to the total bonding area. The samples are then heat treated in a tube furnace under an $N_2$ atmosphere at test-limit temperatures of about 250° C., about 300° C., about 400° C., or up to about 500° C., or in a MPT-RTP600s Rapid Thermal Processing system under an $N_2$ atmosphere at test-limit temperatures of about 250° C., about 300° C., about 400° C., or up to about 500° C., for 10 minutes. Specifically, the time-temperature cycle used includes: inserting the article into the heating chamber at room temperature and atmospheric pressure; heating the chamber to the test-limit temperature at a rate of 9° C. per minute; holding the chamber at the test-limit temperature for about 10 minutes; cooling the chamber at furnace rate to 200° C.; removing the article from the chamber and allow the article to cool to room temperature; and scanning the article a second time with the optical scanner. The percent blister area from the second scan can be then calculated as above and compared with the percent blister area from the first scan to determine a change in percent blister area. As noted above, a change in blister area equal to or greater than 5% is significant and an indication of outgassing. A change in percent blister area was selected as the measurement criterion because of the variability in original percent blister area. That is, most surface modification layers have a blister area of less than about 2% in the first scan due to handling and cleanliness after the thin sheet and carrier have been prepared and before they are bonded. However, variations may occur between materials.

The percent blister area can also be characterized as the percent of total surface area of the modification layer bonding surface not in contact with the second sheet bonding surface 24. The change in percent blister area (or pillowing) represents the percent blister area before thermal treatment subtracted from the percent blister area after thermal treatment. As described above, the percent of total surface area of the modification layer bonding surface not in contact with the second sheet is desirably less than about 10%, less than about 8%, less than about 5%, less than about 3%, less than about 1%, less than about 0.1% and up to less than about 0.01% after the glass article is subjected to a temperature cycle by heating in a chamber cycled from room temperature to about 250° C., about 300° C., about 400° C., or up to about 500° C. and then held at the test temperature for 10 minutes before allowing the glass article to cool to room temperature.

An advantage of the cationic surfactants and organic salts disclosed herein is that the modification layers 30 produced resulted in minimal blistering. Blister formation is believed to be the result of the decomposition of the organic coating at high temperature. While the decomposition mechanisms are varied, e.g. desorption of lower molecular weight moieties or oxidation into CO and/or $CO_2$, in general, decomposition leads to the production of gaseous species at high temperatures. Excessive liberation of gaseous products can lead to the formation of blisters or bubbles between the first sheet 10 and the second sheet 20 at high temperatures. In the present disclosure, blister formation was minimized in a three-pronged approach: 1) selection of molecules having cationic head groups that adsorb strongly to the negatively charged glass surface lowers the chance of desorption at high temperature; 2) selection of molecules that are free, or substantially free of oxygen; and 3) the ability to use as little material as possible so that even if it does degrade, the amount of gaseous species is too low to form appreciable blisters. It was surprisingly found that the compounds disclosed herein could form sub-monolayer modification layers 30, thus minimizing the amount of material used while still maintaining the temporary bond between the sheets 10, 20 such that removal of the carrier was possible.

In some embodiments, the percent blister area is less than 1%, less than 0.1%, or less than 0.001% after holding the article at 350° C. for 2 hours. In some embodiments, the percent blister area is less than 1%, less than 0.1%, or less than 0.001% after holding the article at 370° C. for 30 minutes. In some embodiments, the change in percent blister area of the modification layer is less than 3% after holding the article at 350° C. for 2 hours. In some embodiments, the percent blister area is less than 1%, less than 0.1%, or less than 0.001% after holding the article at 350° C. for 2 hours. In some embodiments, the change in percent blister area of the modification layer is less than 3% after holding the article at 370° C. for 30 minutes.

Debonding of the Modification Layer

The modification layer described herein allows the second sheet to be separated from the first sheet without breakage of the first sheet and, further, without breakage of the second sheet into two or more pieces after the glass article is subjected to the above temperature cycling and thermal testing.

EXAMPLES

Example 1a: Surface Treatment with Cetyltrimethylammonium Bromide (CTAB)—Wafer/Spin Coating CTAB is a cationic surfactant having a quaternary ammonium group.

1) A stock solution of CTAB was prepared in water and diluted to make solutions having concentrations ranging from 0.05 mM to 0.3 mM.

2) Corning® EAGLE XG® glass (available from, Corning Incorporated, Corning N.Y.) wafers (0.5 mm thick) and Willow® glass substrates (available from Corning Incorporated) 100 μm thick were first treated with $O_2$ plasma for 5 minutes, followed by a rinse (or wash) step using hydrogen peroxide: JTB100 (ammonia) cleaner (JT Baker Chemicals): $H_2O$ (2:1:40) solution for 10 minutes. After cleaning, the glass wafers were spin-rinse-dried.

3) Different concentrations of CTAB were spin coated (30 seconds at 500 rpm, followed by 1.5 minutes at 2000 rpm) on EAGLE XG® wafers.

4) Both the CTAB-coated EAGLE XG® wafers and cleaned Willow® glass substrates were held at 150° C. for 2 minutes to remove residual water. Each EAGLE XG® wafer was bonded with a Willow® glass substrate by bringing it into optical contact and applying pressure at the middle point of the pair. At lower concentrations, the CTAB coating on the EAGLE XG® wafer was on the order of sub-monolayer, and a bond-wave self-propagated due to the polar interactions between the glass surface hydroxyl groups and the cationic head group of the surfactant coating. At increasing concentrations, CTAB made the surface of the EAGLE XG® wafer relatively hydrophobic and self-propagation of the bond wave became difficult. A laminator was used to bond the wafer to the thin sheet when self-propagation did not occur.

5) The bonded pairs underwent thermal treatment at 250° C. for 2 hours (CF process, data not shown), 350° C. for 2 hours (a-Si process) or 370° C. for 30 minutes (ox-TFT process) in a tube furnace under a $N_2$ environment.

6) After the bonded pairs returned to room temperature, the glass articles were analyzed for blister growth and new blister formation. The bond energy between the EAGLE XG® wafer and the Willow® glass substrate was measured by inserting metal blades at the four corners and averaging the value. See Table 3 below.

7) The glass articles were then manually completely debonded by lifting the EAGLE XG® wafer from the Willow® glass substrate by attaching a piece of Scotch™ tape to the EAGLE XG® wafer and lifting the wafer off.

8) A set of the EAGLE XG® wafers coated with different concentrations of CTAB, prior to bonding with a Willow® glass substrate, were used for contact angle measurements with the following three liquids: water, hexadecane, and diiodomethane. See Table 1 above and FIG. 3a.

Figure 3A:
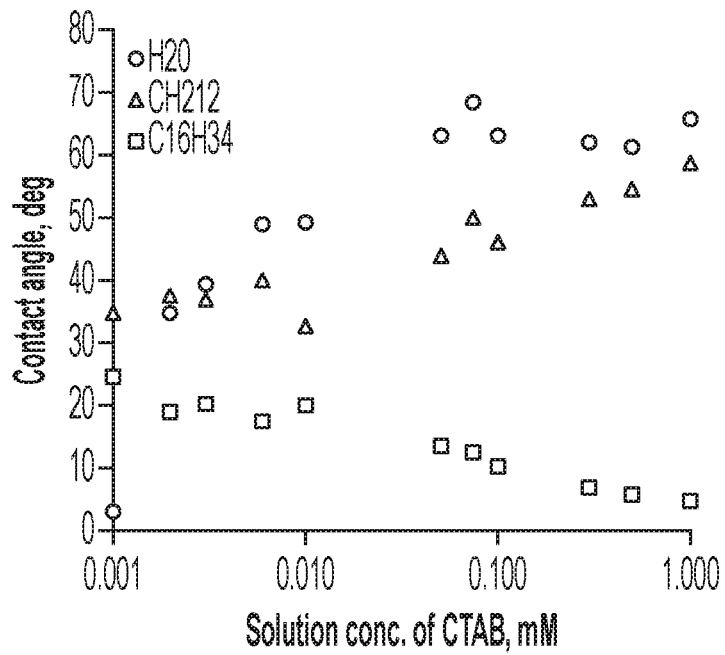
FIG. 3 is a graph of contact angle (degrees, y-axis) for water (circles), hexadecane (squares), and diiodomethane (triangles) plotted as a function of cationic surfactant (FIG. 3a: CTAB.
FIG. 3b: OTAB.
FIG. 3c: CPCl.
FIG. 3d: BPCl)) or organic salt
(FIG. 3e: TMAB.
FIG. 3f: TPhPCl) concentration.

FIG. 3a shows the contact angle (degrees, y-axis) for water (circles), hexadecane (squares), and diiodomethane (triangles) plotted as a function of cationic surfactant (CTAB) concentration. As can been seen in the figure, the CTAB modification layer demonstrated an increasing water contact angle with increasing applied CTAB concentration at lower concentrations. That is, the water contact angle increases from less than 5° to approximately 65° over a CTAB concentration ranging from 0.001 mM to 0.1 mM. At CTAB concentrations above 0.1 mM, the water contact angle remains approximately constant between 60-70°. This behavior suggests that at concentrations of less than or equal to 0.1 mM, CTAB forms a modification layer that is sub-monolayer. In other words, at low concentrations, CTAB forms a modification layer that does not cover the entire surface of the glass, yet still bonds to the glass substrate. At concentrations above 0.1 mM, it is believed that the surface of the EAGLE XG® carrier is fully covered by a monolayer of CTAB. Despite this sub-monolayer behavior at low concentrations, as characterized below CTAB still provides for excellent temporary adhesion, blistering and removability as a sub-monolayer modification layer.

Figure 4A:
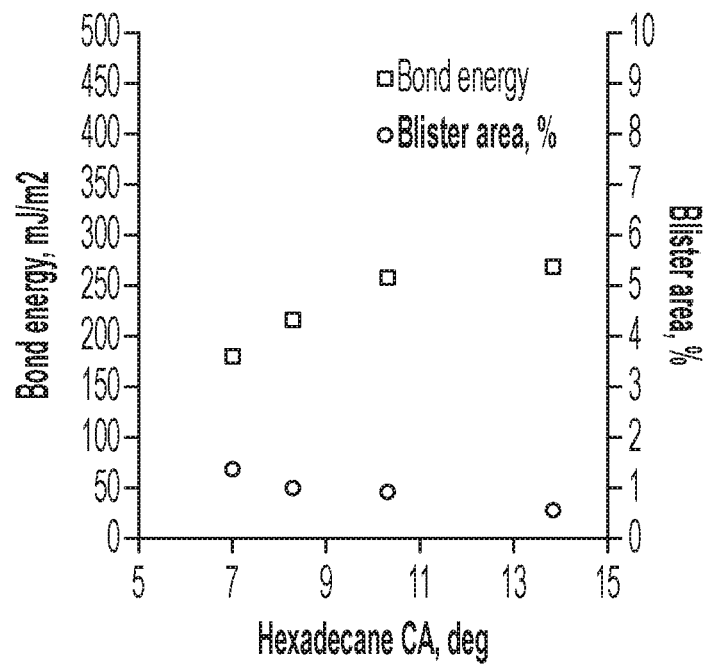
FIG. 4a is a graph of bond energy ($mJ/m^2$, left hand y-axis, closed squares) and blister area (%, right hand y-axis, open circles) of glass articles including CTAB modification layers vs. hexadecane contact angle (degrees, x-axis) following thermal treatment in an oven at 350° C. for 2 hour.

Table 3 (below) provides the data for CTAB modification layers deposited on EAGLE XG® wafers and further having a Willow® glass substrate (thickness of 100 nm) coupled to the EAGLE XG® wafers via the modification layer after annealing in an oven at 350° C./2 hour. Additional data is presented graphically in FIG. 4a, with the bond energy ($mJ/m^2$, left hand y-axis, closed squares) and blister area (%, right hand y-axis, open circles) of glass articles including CTAB modification layers plotted as a function of the hexadecane contact angle (degrees, x-axis). The glass articles resulting from CTAB deposition bonded easily via a self-propagating wave. As deposited, the CTAB modification layers produced bond energies varying from approximately 120 $mJ/m^2$-320 $mJ/m^2$ (as detailed in Table 3) for concentrations ranging from 0.5 mM to 0.01 mM after thermal treatment in an oven at 350° C. for 2 hours. The glass articles having modification layers formed by treatment with CTAB solutions of 0.05 mM-0.5 mM were easily debondable following thermal treatment in an oven at 350° C. for 2 hours without any breaking of the Willow® glass substrate. Debonding was not tested for the article formed from treatment with the 0.01 mM CTAB solution, as indicated by "N/A" in Table 3 below.

TABLE 3

CTAB wafer/spin coating bond energy and debondability following thermal treatment at 350° C. for 2 hours

| Concentration (mM) | Total BE ($mJ/m^2$) | Debondability | Blistering |
|---|---|---|---|
| 0.5 | 126.79 | no | significant |
| 0.3 | 191.62 | yes | small increase |
| 0.1 | 309.52 | yes | insignificant |

TABLE 3-continued

CTAB wafer/spin coating bond energy and debondability
following thermal treatment at 350° C. for 2 hours

| Concentration (mM) | Total BE (mJ/m$^2$) | Debondability | Blistering |
|---|---|---|---|
| 0.075 | 283.71 | yes | insignificant |
| 0.05 | 298.44 | yes | insignificant |
| 0.01 | 314.41 | N/A | insignificant |

Blister growth and new blister formation were measured at room temperature following thermal treatment. For those glass articles heat treated in an oven at 350° C. for 2 hour, modification layers resulting from treatment ranging from 0.1 mM to 0.01 mM CTAB did not have any significant blister growth. The difference in blister area for these glass articles was about ~0.01-0.1% of the total bonded area, well within the acceptable range for blistering of the annealed glass article. The glass article having a modification layer resulting from treatment with 0.3 mM CTAB had a small increase in blister growth following thermal treatment, but was still well within the 5% blistering threshold detailed above. The glass article having the modification layer resulting from treatment with the 0.5 mM CTAB solution had a significant increase in blistering following thermal treatment and did not pass the criteria set forth above for blister growth.

Figure 4B:
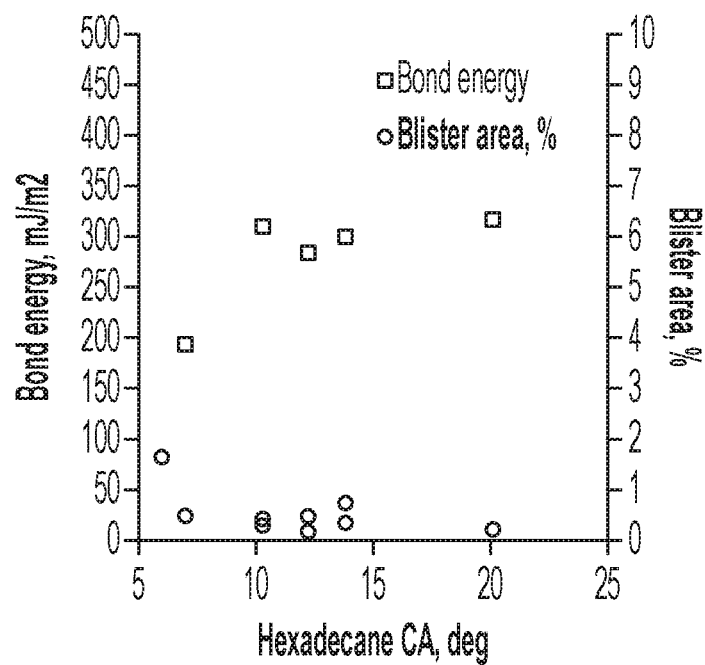
FIG. 4b is a graph of bond energy ($mJ/m^2$, left hand y-axis, closed squares) and blister area (%, right hand y-axis, open circles) of glass articles including CTAB modification layers vs. hexadecane contact angle (degrees, x-axis) following thermal treatment at 370° C. in an oven for 30 minutes.

Table 4 below and FIG. 4b show the bond energy (mJ/m$^2$, left hand y-axis) and blister area (%, right hand y-axis) of glass articles including CTAB modification layers deposited on EAGLE XG® carriers and further having a Willow® glass substrate (thickness of 100 nm) coupled to the carrier via the modification layer after annealing at 370° C./30 minutes as a function of the hexadecane contact angle (degrees, x-axis). The bond energies after thermal treatment in an oven at 370° C. for 30 minutes demonstrated concentration-dependent bond energies ranging from about 180 mJ/m$^2$-270 mJ/m$^2$ (closed squares) for modification layers formed from CTAB deposited at concentrations ranging from 0.3 mM to 0.05 mM. All of the glass articles having CTAB modification layers that underwent thermal treatment in an oven at 370° C. for 30 minutes were easily debondable following thermal treatment without any breaking of the Willow® glass substrate. No significant increase in blistering was observed for any of the CTAB modification layers treated in an oven at 370° C. for 30 minutes. Thus, it appears for some modification layers, the treatment conditions of 370° C. for 30 minutes are less severe than thermal treatment at 350° C. for 2 hours.

TABLE 4

CTAB wafer/spin coating bond energy and debondability
following thermal treatment at 370° C. for 30 minutes

| Concentration (mM) | Total BE (mJ/m$^2$) | Debondability | Blistering |
|---|---|---|---|
| 0.05 | 270.70 | yes | insignificant |
| 0.1 | 259.92 | yes | insignificant |
| 0.2 | 216.47 | yes | insignificant |
| 0.3 | 179.87 | yes | insignificant |

Example 1b: Surface Treatment with CTAB—Gen 5/in-Line Treatment

CTAB was tested for scaled up CF and a-Si applications in Gen5 roll-to-sheet (R2S) trials.

For R2S processing, dry glass sheets (no pre-wash) were spray coated in the Gen 5 washing line and Willow® glass sheets temporarily bonded to EAGLE XG® carriers were prepared by applying a solution of 0.1 mM CTAB via spraying at a flow rate averaging 25 liters per minute. Following deposition of the cationic surfactant solution onto the EAGLE XG® carrier, the carrier glass was rinsed with water at a flow rate of 25 liters per minute to remove excess surfactant prior to bonding. The treated EAGLE XG® carrier was bonded to a similarly sized Willow® glass sheet at room temperature and initial blistering was measured. Thermal annealing in ambient air was done at 350° C. and held for 2 hours (starting temperature 130° C., ramped to 425° C. at a rate of 8° C. per minute). After holding, the glass article was cooled to room temperature for further testing.

Figure 5:
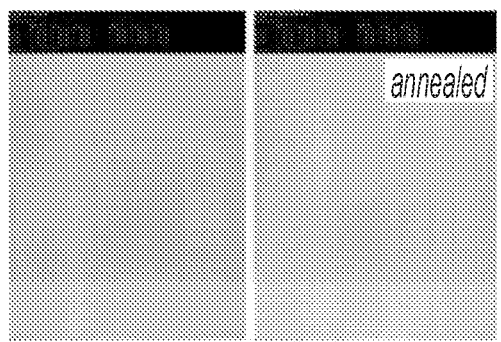
FIG. 5 shows scanned images of the Gen 5 Corning® Willow® glass on Corning® EAGLE XG® carrier following 0.1 mM CTAB treatment before (left) and after (right) heat treatment at 350° C. for 2 hours.

The bond energy of a Gen 5 glass sheet treated with 0.1 mM aqueous solution of CTAB was ~730 mJ/m$^2$. The glass article was debondable. FIG. 5 shows scanned images of the Gen 5 Willow® glass sheet temporarily bonded to an EAGLE XG® carrier following 0.1 mM CTAB treatment before (left) and after (right) heat treatment at 350° C. for 2 hours. As can be seen, there was no significant blistering prior to annealing or as a result of heat treatment. The increase in blister area was less than 0.003% (see Table 5 below).

TABLE 5

Blister counts for Gen 5 glass article formed
with 0.1 mM CTAB and annealed at 350° C./2 hour

| annealing | blister 0.5-1 mm (counts) | blister 1-5 mm (counts) | blister >5 mm (counts) | % blistering | change in % blistering |
|---|---|---|---|---|---|
| before | 91 | 8 | 0 | 0.0225 | — |
| after | 135 | 9 | 0 | 0.0256 | >0.003% |

Example 2: Surface Treatment with Octyltrimethylammonium Bromide (OTAB)—Wafer/Spin Coating OTAB is a cationic surfactant having a quaternary ammonium group.

A stock solution of OTAB was prepared and diluted to solutions of different concentrations ranging from 0.05 mM to 1 mM in water. Deposition of the surfactant and testing of the resulting properties was carried out as set forth in Example 1a above.

Figure 3B:
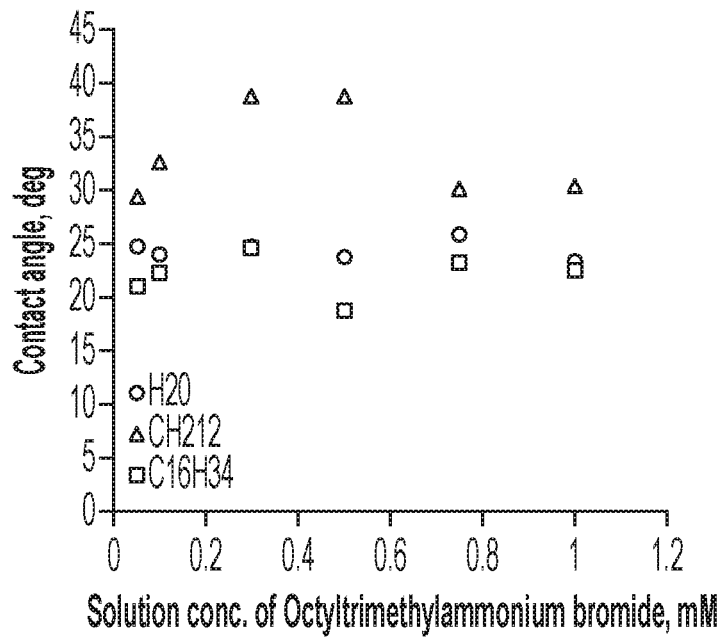

FIG. 3b shows the contact angle (degrees, y-axis) for water (circles), hexadecane (squares), and diiodomethane (triangles) plotted as a function of OTAB concentration for varying concentrations of OTAB applied to EAGLE XG® glass wafers.

Figure 6:
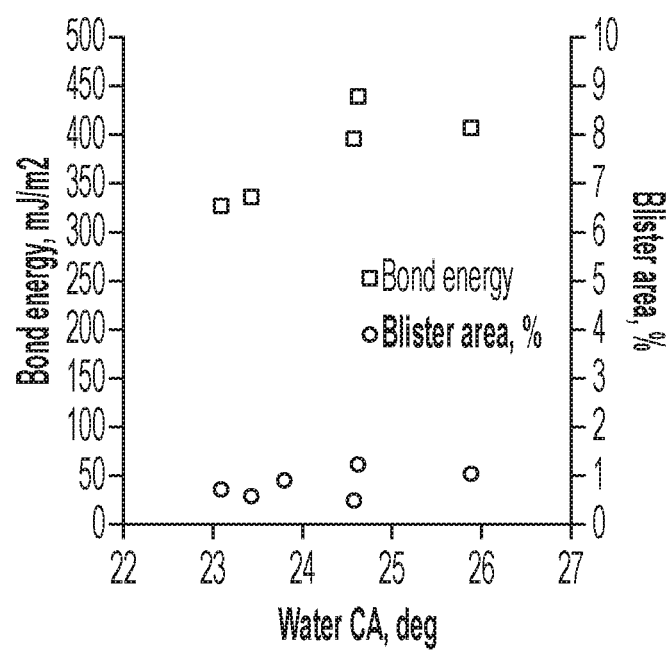
FIG. 6 is a graph of bond energy (mJ/m$^2$, left hand y-axis, closed squares) and blister area (%, right hand y-axis, open circles) of Willow® glass substrates coupled to EAGLE XG® carrier sheets via OTAB modification layers after annealing at 350° C./2 hour in an oven as a function of the water contact angle (degrees, x-axis).

Table 6 shows the bond energies, blistering and debondability of a glass article including an OTAB modification layer. FIG. 6 shows the bond energy (mJ/m$^2$, left hand y-axis, closed squares) and blister area (%, right hand y-axis, open circles) of Willow® glass substrates coupled to EAGLE XG® wafers via OTAB modification layers after annealing in an oven at 350° C./2 hour as a function of the water contact angle (degrees, x-axis). The bond energy values ranged from about 320 mJ/m² to 440 mJ/m² for OTAB concentrations ranging from 1 mM to 0.05 mM after thermal annealing at 350° C. for 2 hours in an oven. For the most part, little blister growth was observed for glass articles that were thermally treated in an oven at 350° C. for 2 hours, with the glass article resulting from the deposition of an OTAB solution having a concentration of 0.75 mM showing a ~0.5% increase in blister growth are following annealing. The glass article treated with 0.3 mM OTAB could be debonded (using a shim) following a-Si treatment conditions (350° C./2 hours in an oven).

TABLE 6

OTAB wafer/spin coating bond energy, blistering, debondability following annealing at 350° C./2 hour

| Conc. (mM) | Bond Energy (mJ/m²) | Blister Growth | Debondable |
|---|---|---|---|
| 1.0 | 326.74 | little growth, no new blisters after annealing | broke |
| 0.75 | 404.84 | decent growth | on the edge only |
| 0.5 | 338.26 | slight growth, no new blisters after annealing | broke |
| 0.3 | 395.96 | decent growth, no new blisters after annealing | yes |
| 0.1 | broke | little growth, no new blisters after annealing | not tested |
| 0.05 | 439.25 | little growth, no new blisters after annealing | broke |

Table 7 shows the bond energies, blistering and debondability of a glass article including an OTAB modification layer following annealing in an oven at 370° C./30 min. The bond energy values ranged from about 230 mJ/m² to 280 mJ/m² for OTAB concentrations ranging from 1 mM to 0.05 mM after thermal annealing. There was very little overall blistering observed, and for most of the glass articles, what blisters were present prior to heat treatment were reduced in size after annealing. All of the glass articles could be easily debonded using a shim following heat treatment in an oven.

TABLE 7

OTAB wafer/spin coating bond energy, blistering, debondability following annealing at 370° C./30 min

| Conc. (mM) | Bond Energy (mJ/m²) | Blister Growth | Debondable |
|---|---|---|---|
| 1.0 | 276.81 | blisters reduced in size after annealing | yes |
| 0.75 | 276.33 | no growth, no new blisters | yes |
| 0.5 | 237.33 | blisters reduced in size after annealing | yes |
| 0.3 | 283.46 | blisters reduced in size after annealing | yes |
| 0.1 | 259.98 | blisters reduced in size after annealing | yes |
| 0.05 | 261.71 | no growth | yes |

Example 3: Surface Treatment with Cetylpyridinium Chloride (CPCl)—Wafer/Spin Coating CPCl is a cationic surfactant having a pyridinium group.
A stock solution of CPCl was prepared and diluted to solutions of different concentrations ranging from 0.1 mM to 0.5 mM. Surfactant deposition and testing were carried out as set forth in Example 1a above.

Figure 3C:
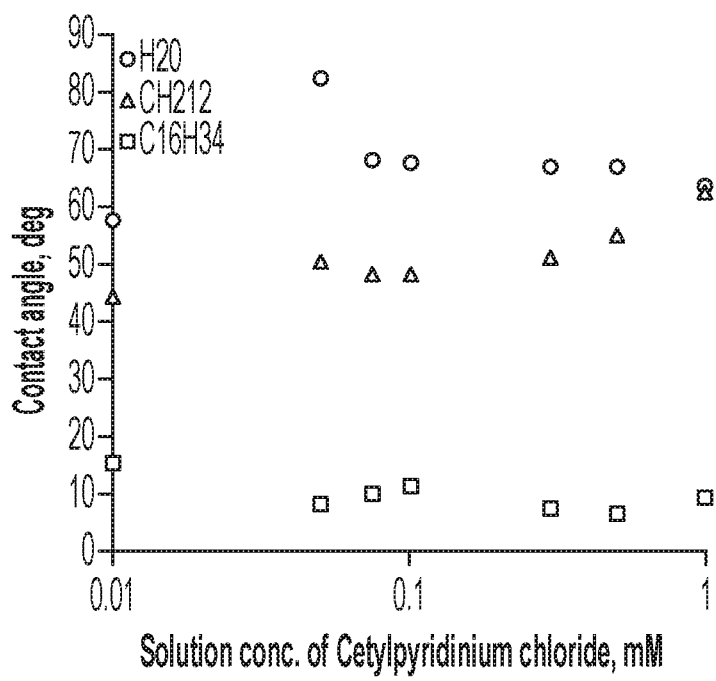

FIG. 3c shows the contact angle (degrees, y-axis) for water (circles), hexadecane (squares), and diiodomethane (triangles) plotted as a function of CPCl concentration for varying concentrations of CPCl applied to EAGLE XG® glass wafers.

Figure 7A:
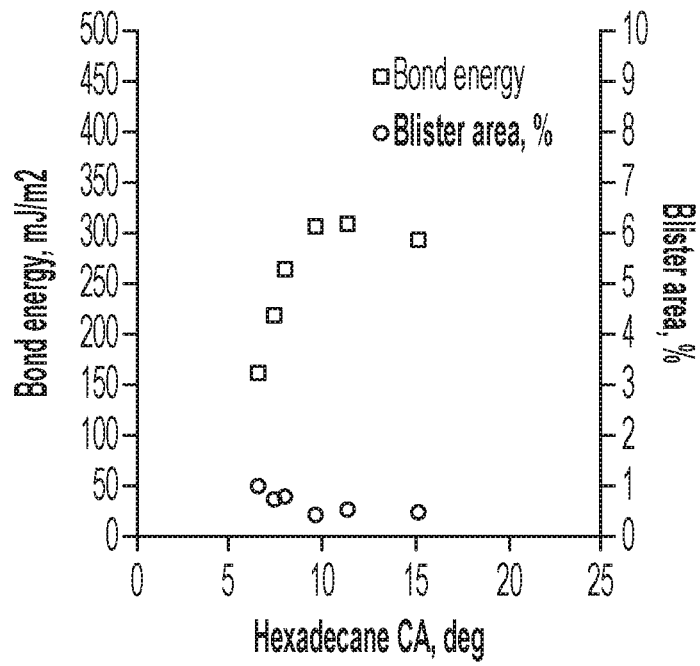
FIG. 7a is a graph of bond energy (mJ/m$^2$, left hand y-axis, closed squares) and blister area (%, right hand y-axis, open circles) of glass articles including CPCl modification layers vs. hexadecane contact angle (degrees, x-axis) following thermal treatment in an oven at 350° C. for 2 hour.
Figure 7B:
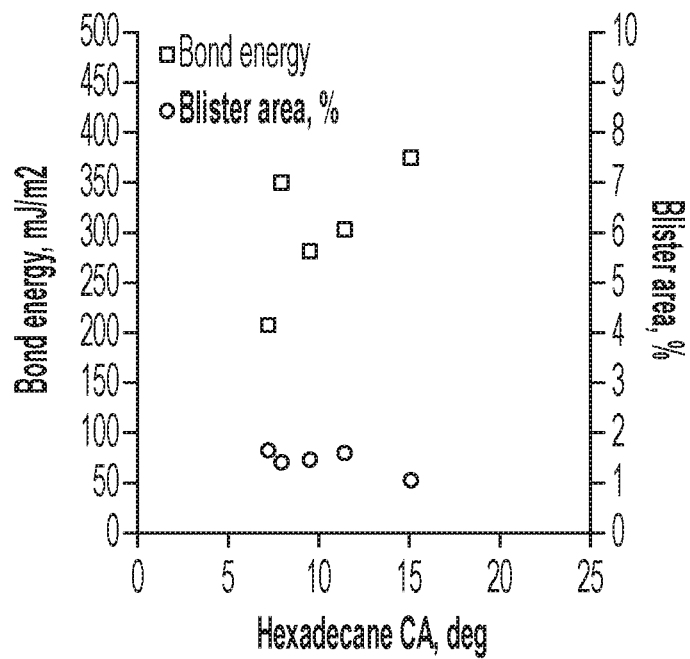
FIG. 7b is a graph of bond energy (mJ/m$^2$, left hand y-axis, closed squares) and blister area (%, right hand y-axis, open circles) of glass articles including CPCl modification layers vs. hexadecane contact angle (degrees, x-axis) following thermal treatment in an oven at 370° C. for 30 minutes.

FIGS. 7a and 7b show the bond energy (mJ/m², left hand Y-axis, closed squares) and blister area (%, right hand Y-axis, open circles) as a function of the water contact angle (degrees, x-axis) for a glass article according to the present disclosure employing an CPCl modification layer. The data of FIG. 7a is measured after annealing the glass article in an oven at 350° C./2 hour. The bond energy values ranged from about 350 mJ/m² to about 150 mJ/m² for CPCl concentrations ranging from 0.1 mM to 0.5 mM after thermal annealing in an oven at 350° C. for 2 hours. An insignificant increase in blister growth was observed following heat treatment for all concentrations.

For glass articles that underwent thermal annealing in an oven at 370° C. for 30 minutes (see FIG. 7b), the bond energy values ranged from about 400 mJ/m² to about 200 mJ/m². No blister growth or new blister formation was observed except for the glass articles resulting from the deposition of 0.3 mM and 0.5 mM CPCl.

All of the glass articles comprising CPCl modification layers were easily debonded without any breakage of the Willow® glass substrate regardless of the thermal annealing conditions.

Example 4: Surface Treatment with 1-Butylpyridinium Chloride (BPCl)—Wafer/Spin Coating BPCl is a cationic surfactant having a pyridinium group.
A stock solution of BPCl was prepared and diluted to solutions of different concentrations ranging from 0.5 mM to 1 mM in water. Surfactant deposition and testing were carried out described in Example 1a above.

Figure 3D:
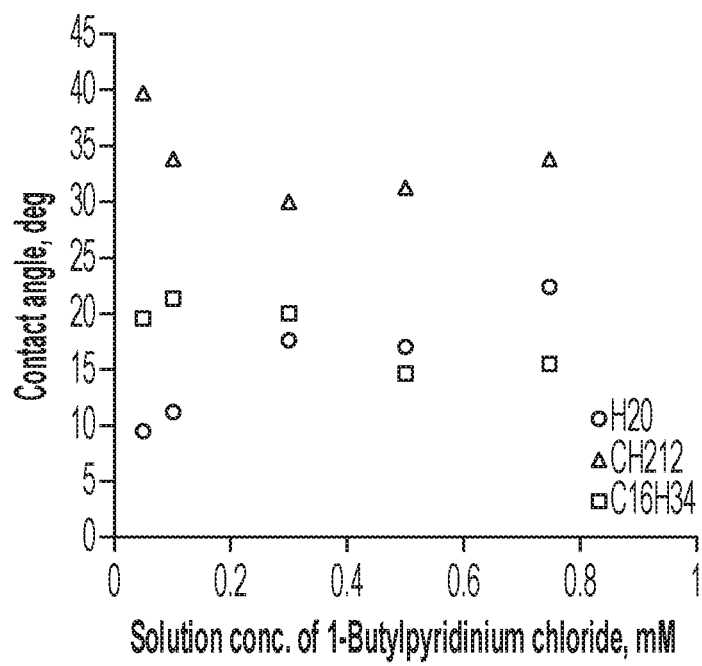

FIG. 3d shows the contact angle (degrees, y-axis) for water (circles), hexadecane (squares), and diiodomethane (triangles) plotted as a function of BPCl concentration for varying concentrations of BPCl applied to EAGLE XG® glass wafers.

Figure 8:
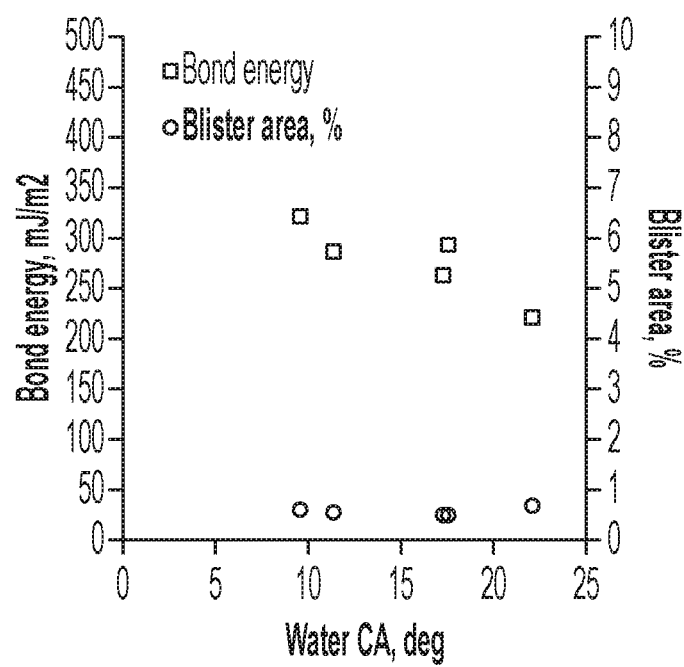
FIG. 8 is a graph of bond energies (mJ/m$^2$, left y-axis, closed squares) and blister area (%, right y-axis, open circles) as a function of water contact angle (degrees, x-axis) of glass articles including BPCl modification layers after thermal treatment in an oven at 350° C. for 2 hours.

FIG. 8 demonstrates the bond energies (mJ/m², left y-axis, closed squares) and blister area (%, right y-axis, open circles) as a function of water contact angle (degrees, x-axis) of glass articles including BPCl modification layers after thermal treatment in an oven at 350° C. for 2 hours. The average bond energies measured by inserting metal blades at the four corners of the bonded glass articles that underwent thermal annealing at 350° C. for 2 hours ranged from 320-210 mJ/m² for concentrations ranging from 0.05 mM to 1 mM, and all glass articles were easily manually debondable using Scotch™ tape. Little blister growth was observed for glass articles that were thermally treated in an oven at 350° C./2 hours, with the 0.75 mM glass article showing only about a 0.04% increase in blister growth area following heat treatment. The modification layer prepared with a 1.0 mM solution of BPCl resulted in a change in blister area of about 0.2%, well within the acceptable blistering thresholds established above.

For BPCl modification layers thermally annealed in an oven at 370° C./30 minutes, the measured bond energies were approximately 360 mJ/m² and 200 mJ/m² for 0.5 and 0.75 mM solutions, respectfully (see Table 8 below). The glass article formed from the 0.75 mM solution was easily debonded following thermal annealing. The glass article formed from the 0.5 mM solution broke upon debonding. No blister growth or new blister formation was observed for glass articles that were thermally treated at 370° C./30 minutes.

TABLE 8

BPCI wafer/spin coating bond energy, blistering, debondability following annealing at 370° C./30 min

| Conc. (mM) | Bond Energy (mJ/m$^2$) | Blister Growth | Debondable |
|---|---|---|---|
| 0.75 | 206.72 | no new blisters after annealing | yes |
| 0.5 | 361.89 | no new blisters after annealing | broke |

Example 5: Surface Treatment with Tetramethylammonium Bromide (TMAB)—Wafer/Spin Coating TMAB is an organic salt with a quaternary ammonium group.

A stock solution of TMAB in water was prepared and diluted to concentrations ranging from 0.1 mM to 2 mM in water. Salt deposition and testing were carried out as set forth in Example 1a above.

Figure 3E:
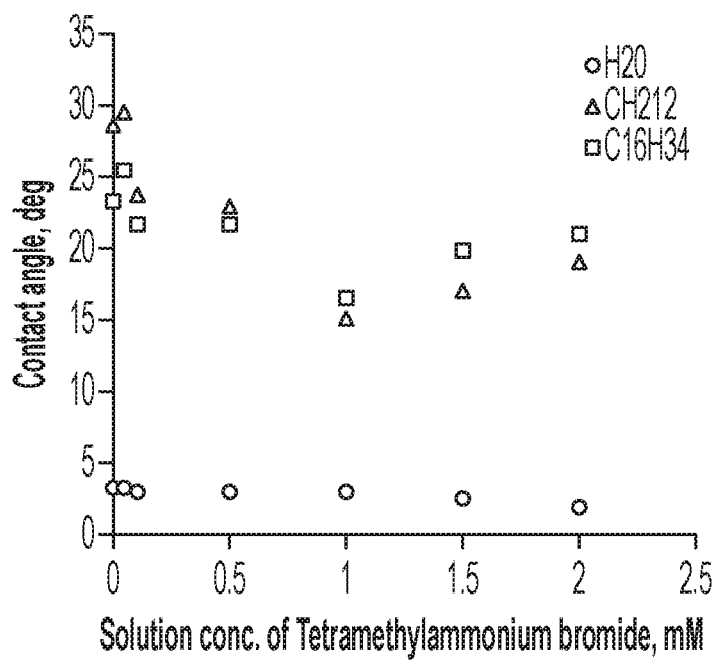

FIG. 3e shows the contact angle (degrees, y-axis) for water (circles), hexadecane (squares), and diiodomethane (triangles) plotted as a function of TMAB concentration for varying concentrations of TMAB applied to EAGLE XG® glass wafers.

Figure 9:
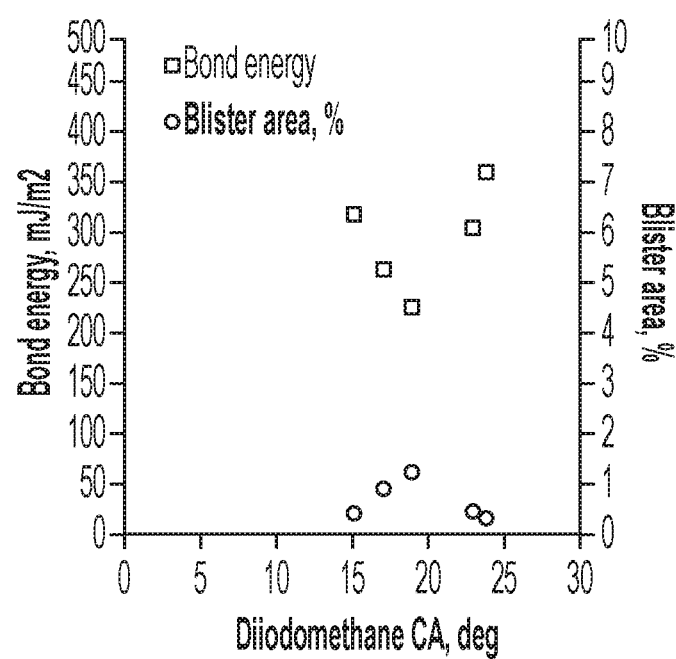
FIG. 9 is a graph of bond energy (mJ/m$^2$, left hand y-axis, closed squares) and blister area (%, right hand y-axis, open circles) as a function of the water contact angle (degrees, x-axis) for glass articles including TMAB modification layers following annealing at 350° C./2 hours in an oven.

FIG. 9 shows the bond energy (mJ/m$^2$, left hand y-axis, closed squares) and blister area (%, right hand y-axis, open circles) as a function of the water contact angle (degrees, x-axis) for a variety of glass articles including TMAB modification layers following annealing in an oven at 350° C./2 hours. As seen in FIG. 9 and Table 9, the average bond energies for the glass articles resulting from the application of aqueous solutions of TMAB of from 0.1 to 2 mM ranged from about 370 to about 225 mJ/m$^2$. No significant blister growth or new blister formation was observed for glass articles having TMAB concentrations up to 1.5 mM that were thermally treated in an oven at 350° C. for 2 hours. All of the glass articles that were treated at 350° C./2 hours in an oven could be debonded.

TABLE 9

TMAB wafer/spin coating bond energy, blistering, debondability following annealing at 350° C./2 hours

| Conc. (mM) | Bond Energy (mJ/m$^2$) | Blister Growth | Debondable |
|---|---|---|---|
| 2.0 | 225.92 | non-wetted patch on original sample | yes |
| 1.5 | 267.33 | no new blisters after annealing | yes |
| 1.0 | 321.49 | negligible | yes |
| 0.5 | 308.83 | little growth | yes |
| 0.1 | 364.93 | little growth | yes |

Table 10 shows the bond energies, blistering and debondability for glass articles comprising modification layers formed from the deposition of TMAB in concentrations varying from 3.0 mM to 1.25 mM and subsequently annealed in an oven at 370° C./30 min. For these glass articles, bond energies varied from about 250 mJ/m$^2$ to about 180 mJ/m$^2$ in a non-concentration dependent manner. None of the glass articles tested resulted in a significant increase in blistering following thermal annealing and all blistering was within acceptable ranges. All glass articles were debondable.

TABLE 10

TMAB wafer/spin coating bond energy, blistering, debondability following annealing at 370° C./30 minutes

| Conc. (mM) | Bond Energy (mJ/m$^2$) | Blister Growth | Debondable |
|---|---|---|---|
| 3.0 | 181.24 | no new blisters after annealing | yes |
| 2.5 | 295.77 | no new blisters after annealing | yes |
| 2 | 234.96 | no new blisters after annealing | yes |
| 1.5 | 232.96 | no new blisters after annealing | yes |
| 1.25 | 244.87 | no new blisters after annealing | yes |

Example 6: Surface Treatment with Tetraethylammonium Bromide (TEAB)—Wafer/Spin Coating TEAB is an organic salt with a quaternary ammonium group.

A stock solution of TEAB in water was prepared and diluted to concentrations ranging from 0.1 mM to 1.75 mM in water. Salt deposition and testing of the glass articles were carried out as set forth in Example 1a above.

Table 2 above presents the contact angles of varying concentrations of TEAB as deposited on EAGLE XG® glass wafers.

Following thermal treatment of the glass article in an oven at 350° C. for 2 hours, the average bond energy values ranged from about 420 to about 260 mJ/m$^2$ for modification layers formed by depositing aqueous solutions of TEAB having concentrations ranging from 0.1 to 1.75 mM, as shown in Table 11 below. At the lowest concentration tested, 0.5 mM, no new blistering was observed. However, blistering performance degraded with increasing applied TEAB salt concentration. Modification layers from 0.75 mM and 1.0 mM applied salt solutions showed some blistering following thermal treatment, but blistering remained within an acceptable range. At higher concentrations, modification layers formed from the deposition of 1.5 mM and 1.75 mM solutions resulted in significant blistering following thermal treatment and blistering was above acceptable limits. Most of the glass articles having TEAB modification layers were manually debondable using Scotch™ tape following thermal treatment of the glass articles in an oven at 350° C./2 hours. However, the glass article bonded with the lowest concentration, 0.1 mM, broke in the middle upon attempted debonding.

TABLE 11

TEAB wafer/spin coating bond energy, blistering, debondability following annealing at 350° C./2 hours

| Conc. (mM) | Bond Energy (mJ/m$^2$) | Blister Growth | Debondable |
|---|---|---|---|
| 1.75 | 269.07 | lots of growth | yes |
| 1.5 | 265.78 | lots of growth | yes |
| 1.0 | 278.02 | some growth | yes |

TABLE 11-continued

TEAB wafer/spin coating bond energy, blistering, debondability following annealing at 350° C./2 hours

| Conc. (mM) | Bond Energy (mJ/m$^2$) | Blister Growth | Debondable |
|---|---|---|---|
| 0.75 | 325.37 | some growth | yes |
| 1.5 | 412.17 | slight growth | yes |
| 0.1 | 352.73 | no growth | broke |

For glass articles formed by the deposition of aqueous TEAB solutions having concentrations ranging from 0.75 mM to 2 mM and subsequently heat treated in an oven at 370° C. for 30 minutes, the average bond energies ranged from 310-250 mJ/m$^2$. The glass article resulting from the deposition of 0.75 mM TEAB did not have significant blistering following thermal treatment at 370° C. for 30 minutes. However, the remaining concentrations of TEAB-treated glass articles tested under these annealing conditions resulted in a significant increase in blistering following heat treatment. All of the glass articles having TEAB modification layers were manually debondable using Scotch™ tape regardless of the TEAB concentration for thermal treatment in an oven at 370° C./30 minutes.

Example 7: Surface Treatment with Tetraphenylphosphonium Bromide (TPhPCl)—Wafer/Spin Coating TPhPCl is an organic salt with a quaternary phosphonium group.

A stock solution of TPhPCl in water was prepared and diluted to concentrations ranging from 0.06 mM to 1 mM in water. Salt deposition and testing were carried out as set forth in Example 1a above.

Figure 3F:
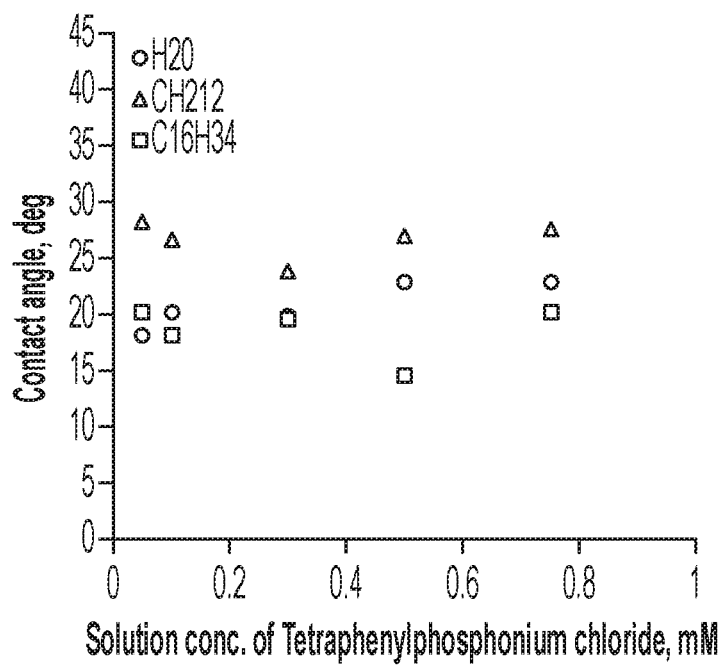

FIG. 3f shows the contact angle (degrees, y-axis) for water (circles), hexadecane (squares), and diiodomethane (triangles) plotted as a function of TPhPCl concentration for varying concentrations of TPhPCl applied to EAGLE XG® glass wafers.

Figure 10:
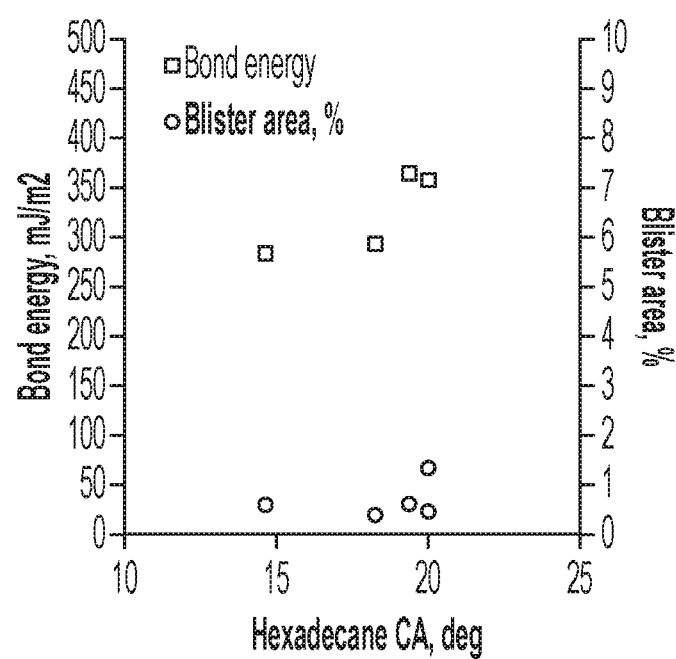
FIG. 10 is a graph of bond energy (mJ/m$^2$, left hand y-axis, closed squares) and blister area (%, right hand y-axis, open circles) as a function of the hexadecane contact angle (degrees, x-axis) for glass articles according to the present disclosure employing an TPhPCl modification layers following heat treatment of 350° C./2 hour in an oven.

FIG. 10 shows the bond energy (mJ/m$^2$, left hand y-axis, closed squares) and blister area (%, right hand y-axis, open circles) as a function of the hexadecane contact angle (degrees, x-axis) for glass articles according to the present disclosure employing TPhPCl modification layers formed by applying the aqueous salt solution at concentrations ranging from 0.1 mM to 0.75 mM. The glass articles were then annealed in an oven at 350° C. for 2 hours as set forth above. As presented in Table 12 below, the average bond energies of glass articles having concentrations varying from 1.0 mM to 0.1 mM ranged from about 440 mJ/m$^2$ to 280 mJ/m$^2$ in a non-concentration dependent manner. Little blister growth was observed for glass articles having TPhPCl concentrations up to 1.0 mM that were thermally treated in an oven at 350° C. for 2 hours. Glass articles having modification layers formed from the deposition of 0.5 to 1 mM TPhPCl solutions could be easily debonded following 350° C./2 hour heat treatment in an oven. The debondability of the glass article formed from the deposition of 0.1 mM TPhPCl was not measured, as indicated by the "N/A" for this sample in Table 12 below. The glass article formed from the deposition of a 0.05 mM solution shattered during the measurement of bond energy and, thus, bond every was not recorded, as indicated by the "N/A" for this sample in Table 12 below.

TABLE 12

TPhPCl wafer/spin coating bond energy, blistering, debondability following annealing at 350° C./2 hours

| Conc. (mM) | Bond Energy (mJ/m$^2$) | Blister Growth | Debondable |
|---|---|---|---|
| 1.0 | 438.18 | little growth, no new blistering | yes |
| 0.75 | 355.73 | decent growth | yes |
| 0.5 | 282.54 | slight growth, no new blistering | yes |
| 0.3 | 361.55 | decent growth, no new blistering | broke |
| 0.1 | 294.38 | little growth, no new blistering | N/A |
| 0.05 | shattered | little growth, no new blistering | N/A |

It will be apparent to those skilled in the art that various modifications and variations can be made to the disclosed embodiments without departing from the spirit and scope of the disclosure. Thus, it is intended that the present disclosure cover any and all such modifications and variations as come within the scope of the appended claims and their equivalents.

For example, the modification layers disclosed herein may be used to bond a carrier to a thin sheet, to bond two carriers together, to bond two or more thin sheets together, or to bond a stack having various numbers of thin sheets and carriers together.

What is claimed is:

1. An article comprising:
a first sheet comprising a first bonding surface;
a second sheet comprising a second bonding surface;
a modification layer comprising a third bonding surface, the modification layer comprising one or more cationic surfactants,
wherein the modification layer couples the first sheet to the second sheet.

2. An article, comprising:
a first sheet comprising a first bonding surface;
a second sheet comprising a second bonding surface;
a modification layer comprising a third bonding surface, the modification layer comprising a cationic surfactant,
wherein the modification layer couples the first sheet to the second sheet, and
wherein the cationic surfactant comprises a head group comprising a charged nitrogen selected from the group consisting of primary, secondary, tertiary, or quaternary ammonium, pyridinium, and combinations thereof.

3. An article, comprising:
a first sheet comprising a first bonding surface;
a second sheet comprising a second bonding surface;
a modification layer comprising a third bonding surface, the modification layer comprising a cationic surfactant,
wherein the modification layer couples the first sheet to the second sheet, and
wherein the cationic surfactant comprises at least one $C_4$-$C_{24}$ hydrophobic group.

4. An article, comprising:
a first sheet comprising a first bonding surface;
a second sheet comprising a second bonding surface;
a modification layer comprising a third bonding surface, the modification layer comprising a cationic surfactant,
wherein the modification layer couples the first sheet to the second sheet, and
wherein the cationic surfactant is selected from the group consisting of cetyltrimethylammonium bromide, cetylpyridinium chloride, octyltrimethylammonium bromide, and 1-butylpyridinium chloride.

5. An article, comprising:
a first sheet comprising a first bonding surface;
a second sheet comprising a second bonding surface;
a modification layer comprising a third bonding surface, the modification layer comprising a cationic surfactant,
wherein the modification layer couples the first sheet to the second sheet, and
wherein the cationic surfactant is substantially free of oxygen.

6. The article of claim 1, wherein the modification layer comprises an average thickness of from about 0.1 nm to about 10 nm.

7. The article of any of the claims 6, wherein the thickness of the modification layer is sub-monolayer.

8. The article of claim 7, wherein the modification layer demonstrates an increasing water contact angle with increasing surfactant concentration.

9. An article, comprising:
a first sheet comprising a first bonding surface;
a second sheet comprising a second bonding surface;
a modification layer comprising a third bonding surface, the modification layer comprising a cationic surfactant,
wherein the modification layer couples the first sheet to the second sheet,
wherein the modification layer comprises an average thickness of from about 0.1 nm to about 10 nm,
wherein the thickness of the modification layer is sub-monolayer
wherein the modification layer demonstrates an increasing water contact angle with increasing surfactant concentration, and
wherein the cationic surfactant is cetyltrimethylammonium bromide.

10. The article of claim 1 wherein the third bonding surface is bonded with the second bonding surface with a bond energy of from about 150 to about 750 mJ/m$^2$ after holding the article at 350° C. for 2 hours.

11. The article of claim 1 wherein the third bonding surface is bonded with the second bonding surface with a bond energy of from about 100 to about 500 mJ/m$^2$ after holding the article at 370° C. for 30 minutes.

12. The article of claim 1, wherein the third bonding surface is bonded with the second bonding surface with a bond energy of from about 300 to about 500 mJ/m$^2$ after holding the article at 370° C. for 30 minutes.

13. The article of claim 1, wherein a change in percent blister area of the modification layer is less than 3% after holding the article at 350° C. for 2 hours.

14. The article of claim 13, wherein the change in percent blister area of the modification layer is less than 1%.

15. The article of claim 14, wherein the change in percent blister area of the modification layer is less than 0.1%.

16. The article of claim 1, wherein a change in percent blister area of the modification layer is less than 3% after holding the article at 370° C. for 30 minutes.

17. The article of claim 16, wherein the change in percent blister area of the modification layer is less than 0.1%.

18. The article of claim 1 wherein an average thickness of the second sheet is equal to or less than about 300 microns.

19. The article of claim 18 wherein the average thickness of the second sheet is less than an average thickness of the first sheet.

20. The article of claim 19 wherein the average thickness of the first sheet is equal to or greater than about 200 microns.

21. The article of claim 2, wherein the modification layer comprises an average thickness of from about 0.1 nm to about 10 nm.

22. The article of claim 3, wherein the modification layer comprises an average thickness of from about 0.1 nm to about 10 nm.

23. The article of claim 4, wherein the modification layer comprises an average thickness of from about 0.1 nm to about 10 nm.

24. The article of claim 5, wherein the modification layer comprises an average thickness of from about 0.1 nm to about 10 nm.

* * * * *

UNITED STATES PATENT AND TRADEMARK OFFICE
CERTIFICATE OF CORRECTION

| | | |
|---|---|---|
| PATENT NO. | : 11,629,096 B2 | |
| APPLICATION NO. | : 16/764120 | |
| DATED | : April 18, 2023 | |
| INVENTOR(S) | : Daniel Florian Acquard et al. | |

It is certified that error appears in the above-identified patent and that said Letters Patent is hereby corrected as shown below:

In the Claims

Column 33, Line 15, Claim 7, delete "any of the claims" and insert -- claim --.

Signed and Sealed this
Twenty-fifth Day of July, 2023

Katherine Kelly Vidal
*Director of the United States Patent and Trademark Office*